CHARACTER AT A TIME DATA MULTIPLEXING SYSTEM

Filed Dec. 14, 1965 6 Sheets-Sheet 1

INVENTORS P. BENOWITZ
M. IGNATOWITZ
D. M. TUTELMAN

BY R C Lipton

ATTORNEY

Sept. 9, 1969 P. BENOWITZ ET AL 3,466,397

CHARACTER AT A TIME DATA MULTIPLEXING SYSTEM

Filed Dec. 14, 1965 6 Sheets-Sheet 3

CHARACTER AT A TIME DATA MULTIPLEXING SYSTEM

Filed Dec. 14, 1965 6 Sheets-Sheet 4

Sept. 9, 1969 P. BENOWITZ ET AL 3,466,397

CHARACTER AT A TIME DATA MULTIPLEXING SYSTEM

Filed Dec. 14, 1965 6 Sheets-Sheet 5

Sept. 9, 1969 P. BENOWITZ ET AL 3,466,397

CHARACTER AT A TIME DATA MULTIPLEXING SYSTEM

Filed Dec. 14, 1965 6 Sheets-Sheet 6

United States Patent Office 3,466,397

Patented Sept. 9, 1969

3,466,397
CHARACTER AT A TIME DATA MULTIPLEXING SYSTEM

Paul Benowitz, Brooklyn, Michael Ignatowitz, Flushing, and David M. Tutelman, Bronx, N.Y., assignors to Bell Telephone Laboratories, Incorporated, New York, N.Y., a corporation of New York Filed Dec. 14, 1965, Ser. No. 513,742
Int. Cl. H04j 3/02
U.S. Cl. 179—15 13 Claims

ABSTRACT OF THE DISCLOSURE

Each input port of a data multiplexing system applies a character at a time rather than a bit at a time to the common highway. After transmitting the character bits, the input port enables the next subsequent port whereby various codes and speeds may be mixed. At the other end of the highway, each output port registers the character from the input port and thereupon enables the next subsequent output port to register the character from its corresponding input port. The receiving end includes equipment for detecting loss of synchronization and for thereupon precluding bit registration by the output ports until synchronization is recovered. A flag bit indicates parity of the character elements and alternatively distinguishes bit sequences for "idle" or "break" conditions from character bits.

Figure 1:
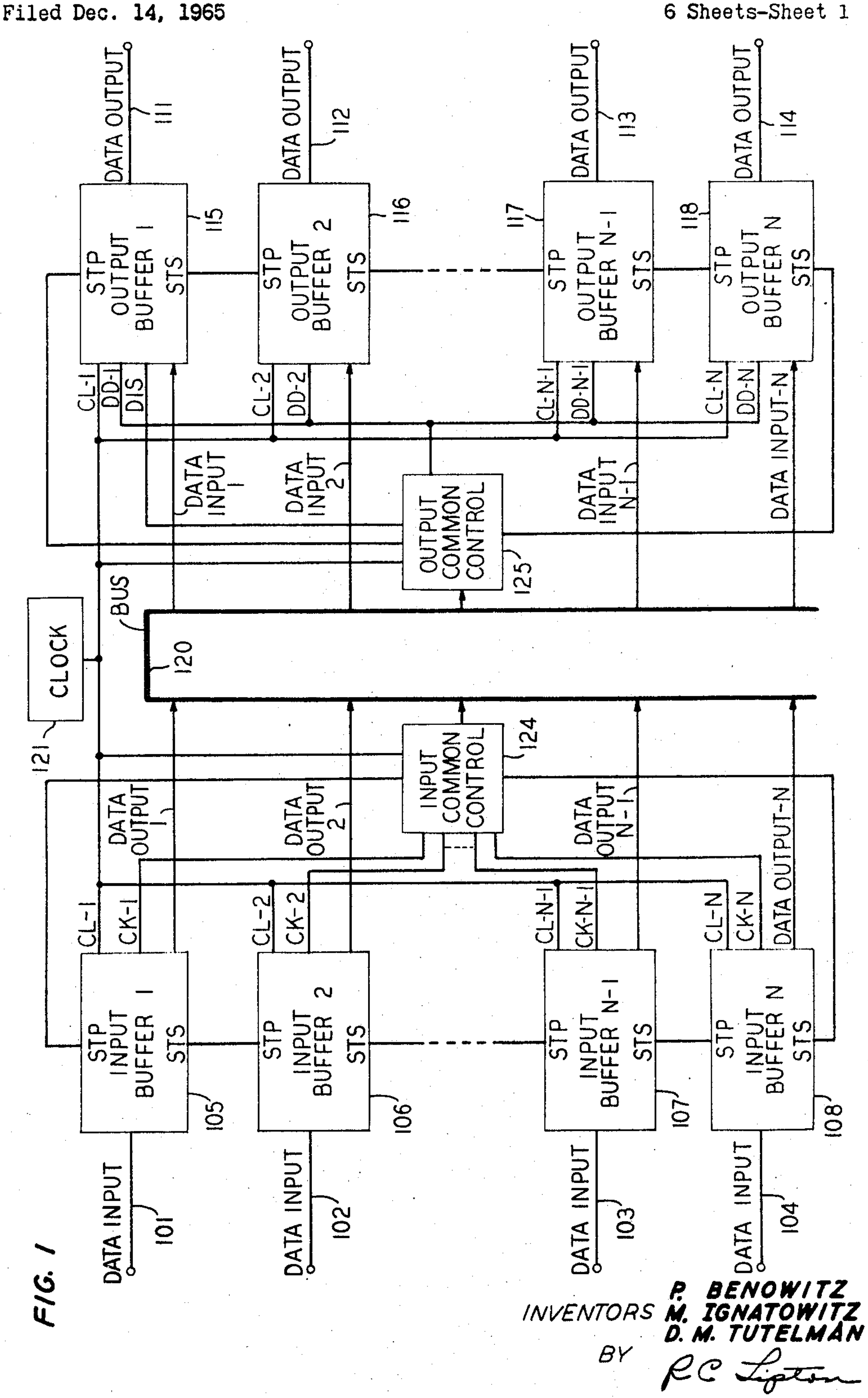

This invention relates to a system for transmitting data characters and, more particularly, to a data transmission system for interconnecting incoming signalling lines with corresponding outgoing lines by way of a common transmission path or bus on a time division basis.

It is a broad object of this invention to provide an improved time division multiplex data transmission system.

When a plurality of data signaling channels are handled by a common facility, it is sometimes convenient to multiplex the signals from all the channels on a common path on a time division basis. Each incoming line applies the signals to an input port of the multiplex system. The input ports are sequentially scanned and a data bit from each input port is transmitted to a common bus together with a framing or synchronizing signal during each scan cycle. At the remote terminal the data bits from the bus are distributed under control of the framing signal to output ports corresponding to the input ports. Each output port applies the distributed bits to an associated outgoing line reconstructing the signals received from the associated incoming line.

Multiplex systems transmitting a bit at a time from each input port during each scan cycle are highly efficient when all individual lines are dedicated to the same data code at identical signaling rates. These systems, however, are not readily adaptable to arrangements where signaling lines are dedicated to different codes and signaling rates. In addition, since multiplex systems transmit the data bits of the code characters interleaved with data bits of other channels, communication of line conditions, such as "idle" or "break" conditions, in the absence of code signaling, is difficult to accomplish. Systems of this type are also highly dependent on the maintenance of synchronization since the loss thereof results in the improper distribution of the data bits to the output ports thus transmitting intelligence data to the wrong channels.

Accordingly, it is an object of this invention to provide a flexible multiplex system which can accommodate signaling lines dedicated to different codes and signaling speeds.

It is another object of this invention to communicate line conditions in the absence of code signaling by way of a multiplex system.

It is a further object of this invention to recover synchronization without distributing intelligence data to the wrong output ports.

In accordance with a feature of this invention, each input port applies a full code character to the bus when scanned. The system thus transmits a character at a time from each input port during each scan cycle.

It is a feature of this invention that each input port, after sending a full character to the common bus, starts the next subsequent input port. The input port determines when a full charcter is transmitted by inserting an additional final bit in the code character and detecting when this final bit is ready to be applied to the bus.

It is another feature of this invention that each output port reads a full character from the common bus and then enables the next subsequent output port. A counter counts each bit as it is read and registered by the output port until the count corresponds to the number of bits in the characters of the code dedicated to the port, whereupon the next output port is enabled.

It is a further feature of this invention that an additional flag bit is inserted by the input port. When a code character is received, the flag bit advantageously corresponds to a parity element in the code. In the event, however, that a prolonged line condition, such as an "idle" or "break" condition, is being received, the flag bit is modified or inverted. This distinguishes the bit sequence for this prolonged condition from code characters, such as "blank" and "rub out," having all elements corresponding to one line condition. The output port, upon registering the flag bit, applies the corresponding prolonged condition to the outgoing line.

It is a further feature of this invention that the output port counters and registers are disabled when synchronism is lost to block the distribution of data to the output ports. While regaining synchronization the counters are reenabled whereby the distribution count is maintained although registration of the data is precluded.

The foregoing and other objects and features of this invention will be fully understood from the following description of an illustrative embodiment thereof taken in conjunction with the accompanying drawing wherein:

FIG. 1 depicts in block schematic form a character at a time multiplex system in accordance with this invention.

Figure 2:
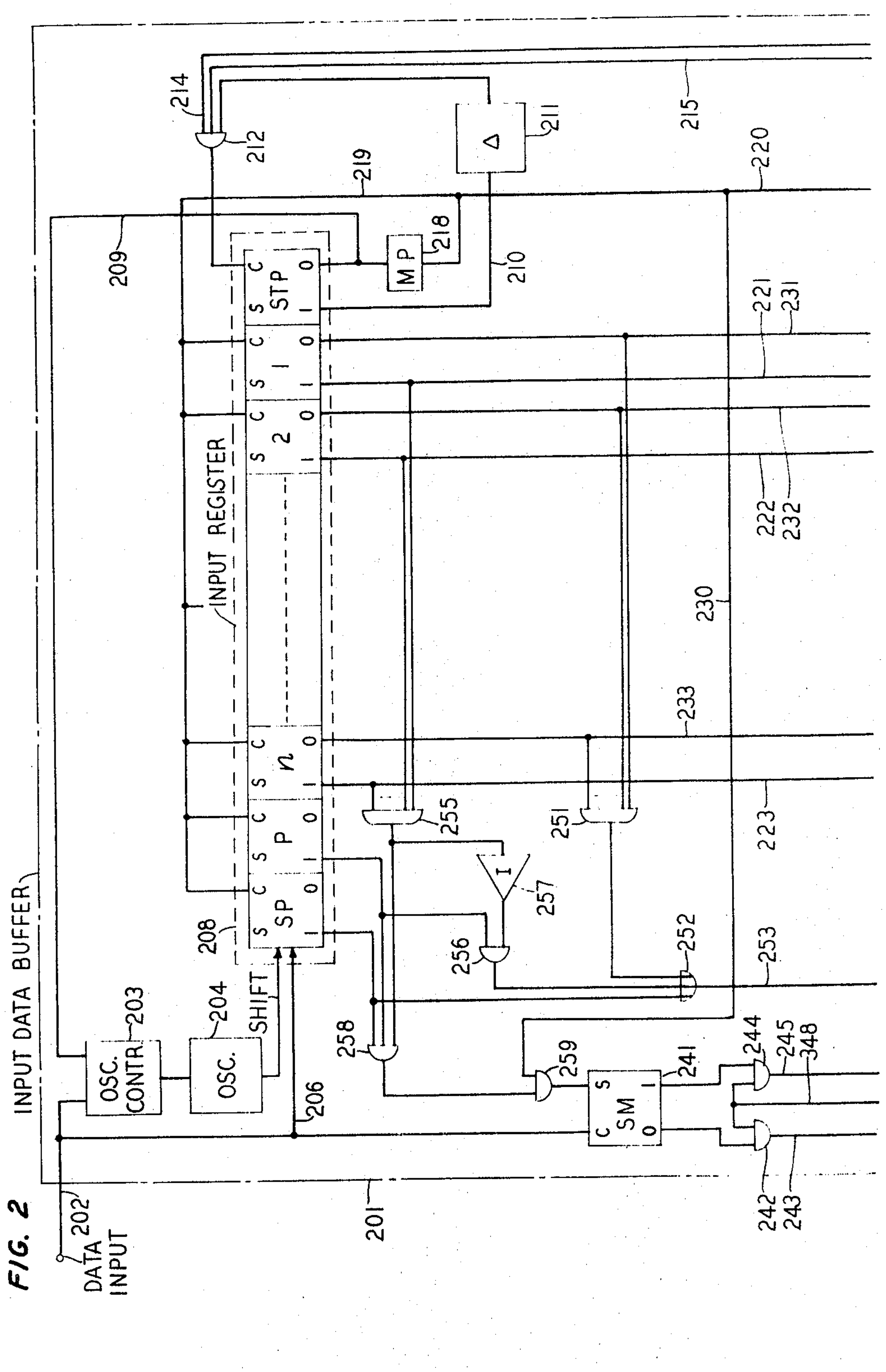
Figure 3:
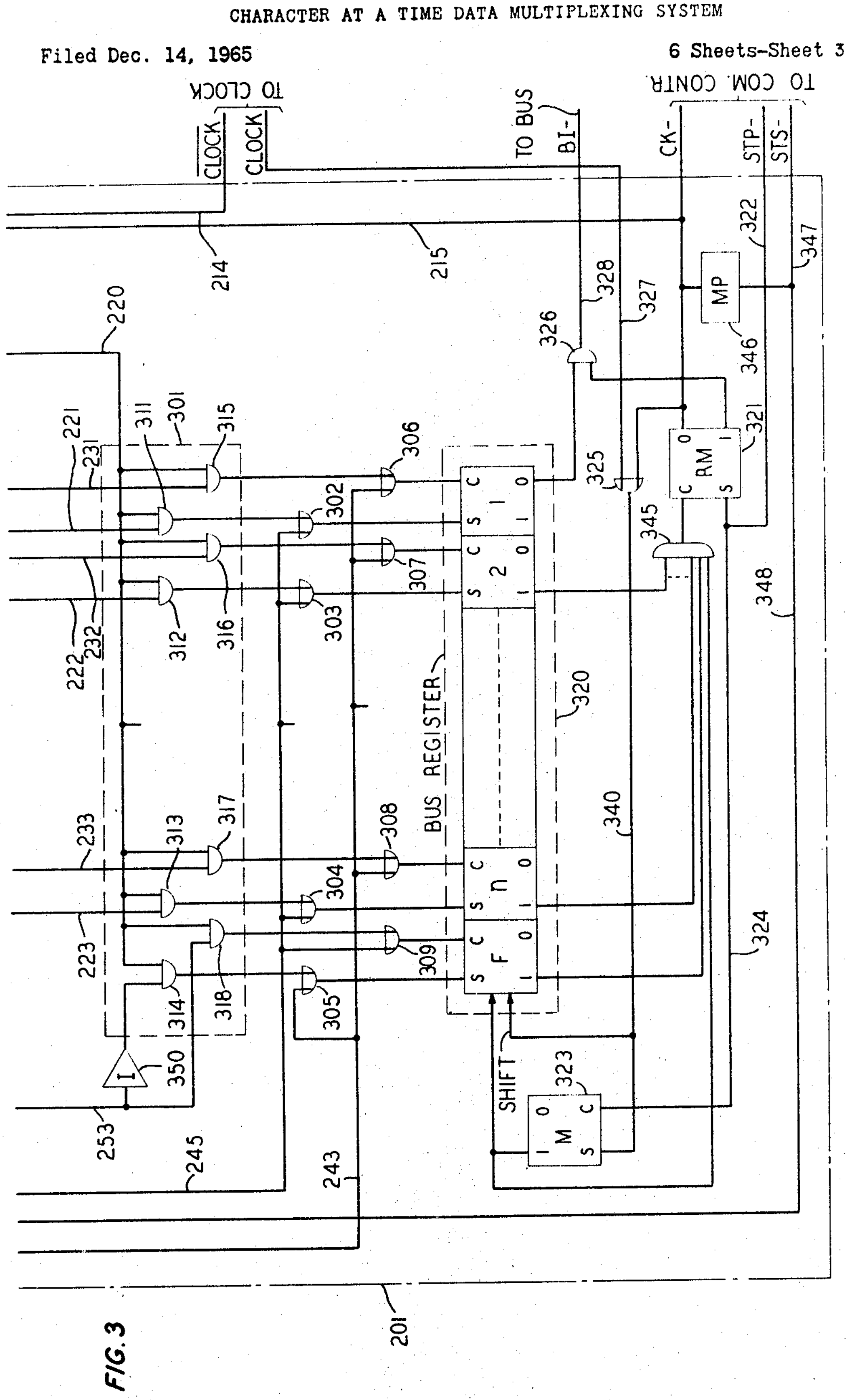
Figure 7:
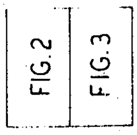

FIGS. 2 and 3 when arranged as shown in FIG. 7 show the details of circuits and equipment which cooperate to form a typical input data port or buffer in accordance with this invention.

Figure 4:
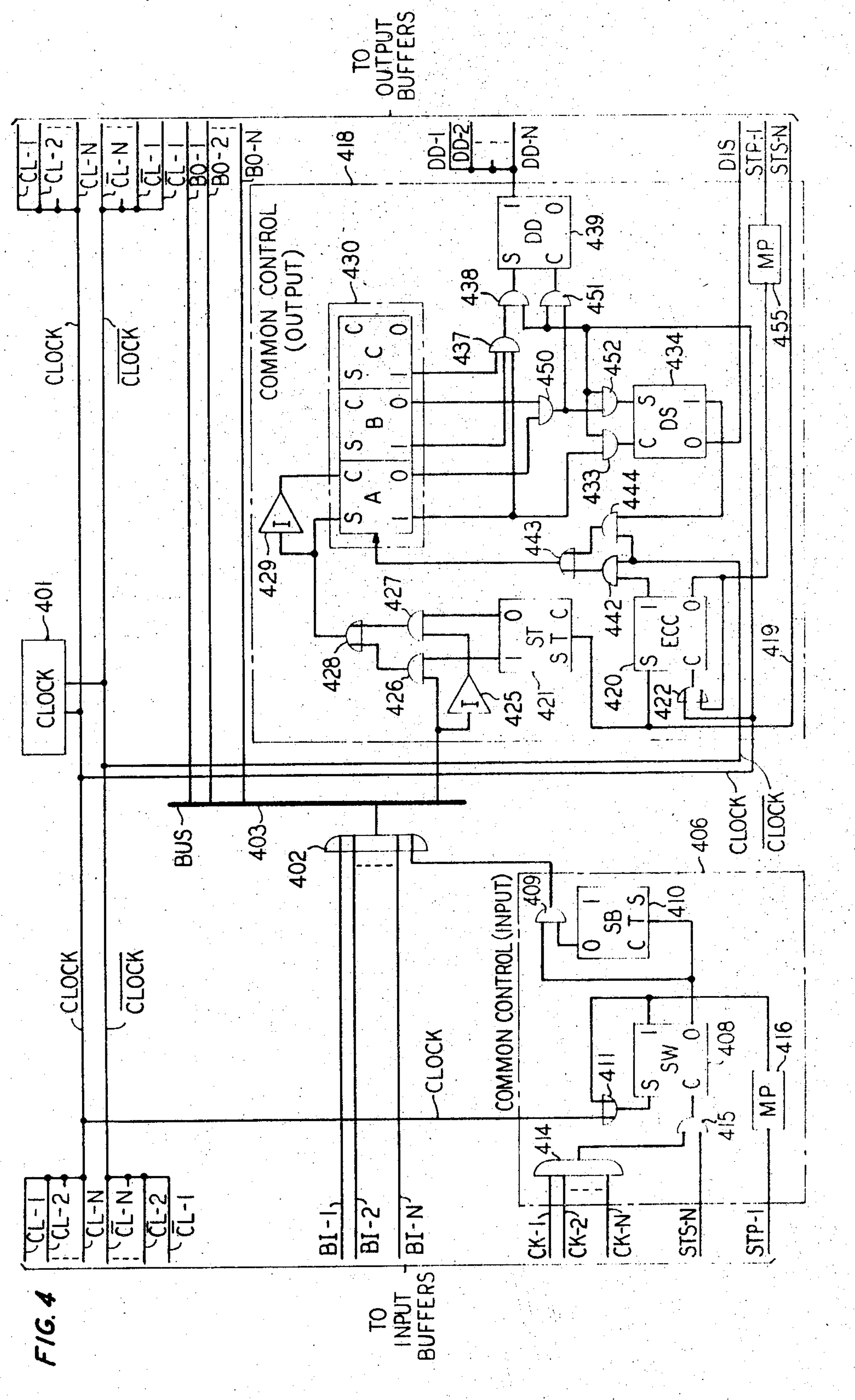
Figure 5:
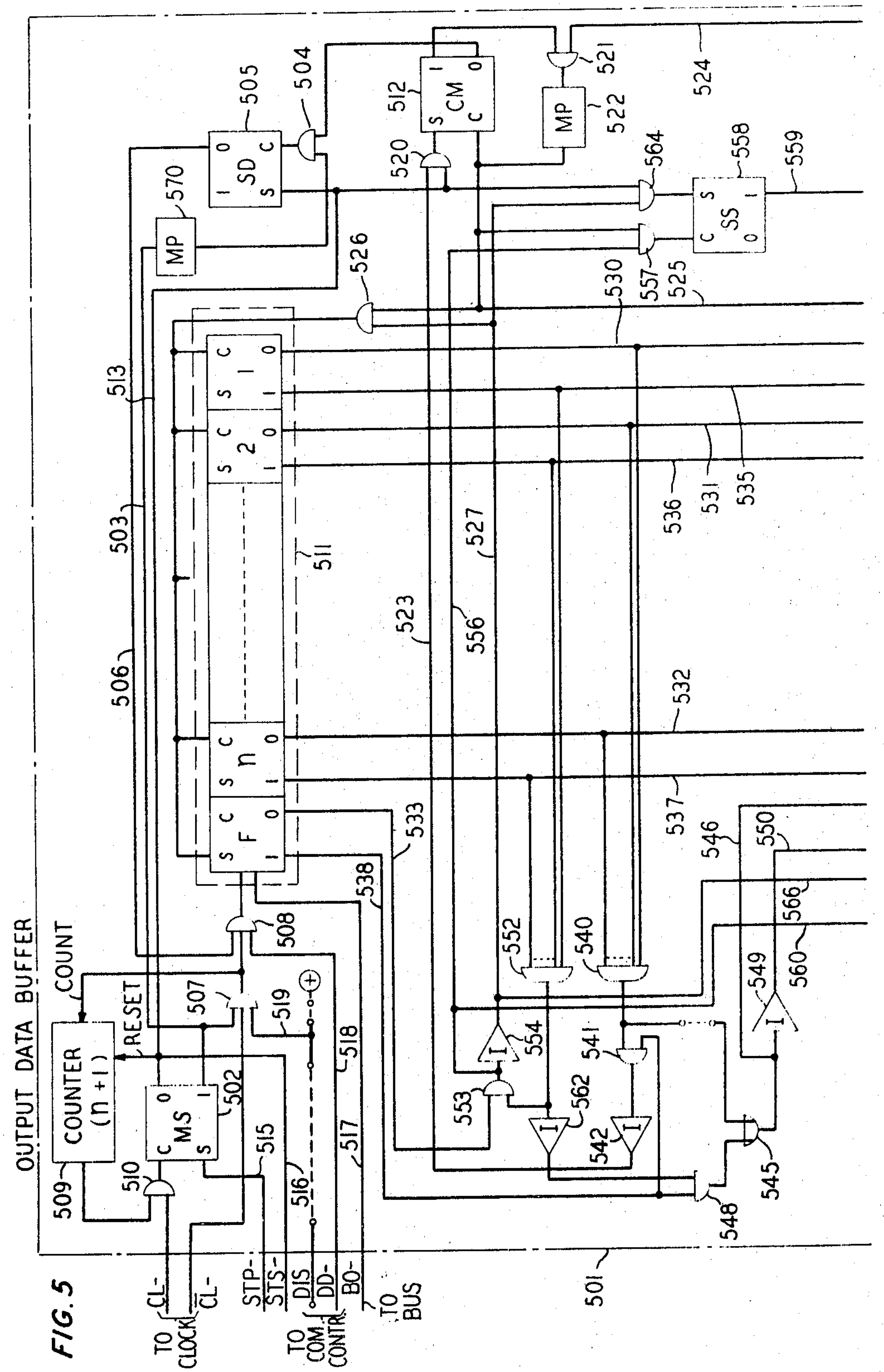
Figure 6:
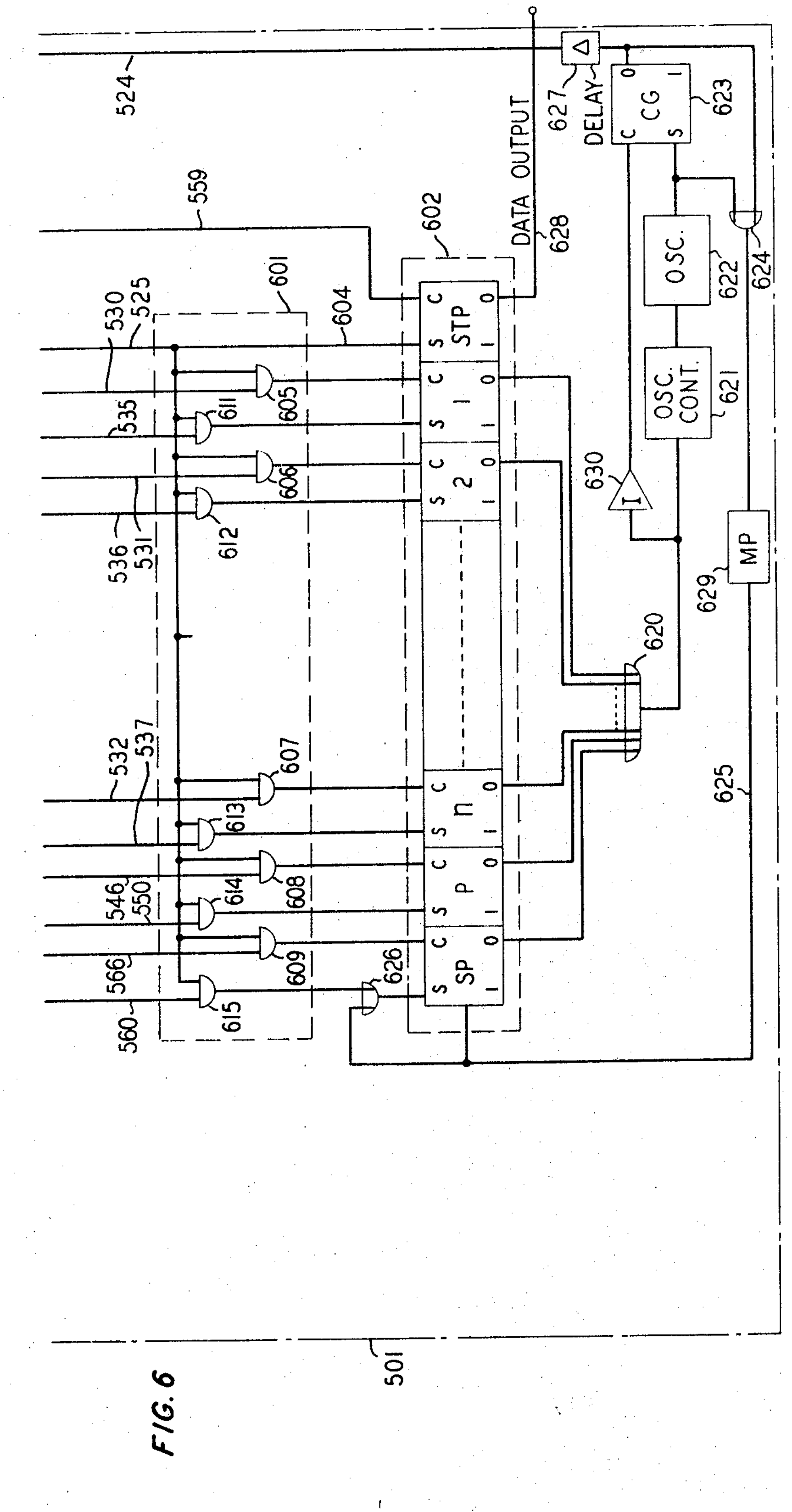
Figure 8:
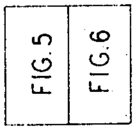

FIG. 4 discloses in schematic form the details of the common transmission path or bus and the input and output common control equipment in accordance with this invention; and FIGS. 5 and 6 when arranged as shown in FIG. 8 show the details of circuits and equipment which cooperate to form a typical output data port or buffer.

General description

Referring now to FIG. 1, data input leads 101 through 104 depict four of a plurality of incoming lines for the multiplex system. Data input leads 101 through 104 are in turn connected to input ports or buffers 105 through 108.

The outgoing lines of the system are shown as data output leads 111 through 114 which leads are connected to output ports or buffers 115 through 118 respectively. The data output leads of input buffers 105 through 108 and the data input leads to output buffers 115 through 118 are interconnected by way of a common transmission path or bus shown as metallic line 120. Although bus 120 may be a short metallic line as shown in FIG. 1, it is understood that bus 120 may also comprise a long transmission line which may include conventional radio or carrier equipment to accept data signals at the input end and reconstruct the data signals at the output end of bus 120.

Common to input buffers 105 through 108 is input common control 124 which, as described hereinafter, controls the readout of the input buffers and the generation of the synchronization or framing signal. Common to output buffers 115 through 118 is output common control 125 which, as described hereinafter, detects the framing signal and upon the detection thereof initiates the distribution of the data bits to the output buffers.

The system also includes clock 121 which provides the clock pulses therefor. In the event that bus 120 constitutes a prolonged transmission path, it is understood that clock 121 may comprise a master clock at either the originating end or the terminating end of bus 120 and a slave clock at the other end maintained in synchronization with the master clock in any manner well known in the art. In any event clock 121 comprises a source of pulses which simultaneously distributes clock pulses to all the input buffers, the output buffers, the input common control and the output common control.

Assuming now that character signals are being received on the incoming lines such as data lines 101 through 104, each of input buffers 105 through 108 proceed to receive the data characters and store them. Assuming also that the readout of input buffer 108 has concluded, a signal is provided by way of its terminal STS to input common control 124. Input common control 124 in response thereto and under control of the next clock pulse from clock 121 applies a framing signal to bus 120. At the conclusion thereof input common control 124 applies an enabling signal to terminal STP of the first input buffer, namely input buffer 105. This enables input buffer 105 to accept clock pulses by way of terminal CL–1 which clock pulses are utilized to read out one data character by way of the data output lead of input buffer 105. In addition, input buffer 105 provides an additional flag bit which bit may may advantageously indicate the condition of the parity element of the code character. In the event, however, that a code character has not been received by way of data input lead 101, input buffer 105 is alternately arranged to invert the flag bit indicating the signaling condition of lead 101 such as the "break" or "idle" condition. In any event, character bits designating the code character or the condition of lead 101 are read out by the clock pulses applied to input buffer 105 until all the bits including the flag bit have been applied to bus 120. Thereupon input buffer 105 signals by way of its terminal STS to terminal STP of input buffer 106. This initiates the operation of input buffer 106 which reads out its character stored therein in substantially the same manner. Accordingly, the input buffers are sequentially enabled to read out a character at a time to bus 120.

When the readout has been concluded by the last input buffer 108, it signals by its output terminal STS as previously described to enable common control 124. This completes a scan cycle, provides a framing signal to bus 120 and initiates a new cycle. It is noted that after all the input buffers have concluded their readout, they apply an enabling potential by way of their CK terminals to input common control 124. This indicates to input common control 124 that no intermediate one of the buffers are operating and permits input common control 124 to provide a framing signal to bus 120 and initiate a new cycle at the conclusion of the readout by input buffer 108.

Recalling now that each cycle is initiated by a framing signal, this framing signal is detected by output common control 125 which scans the bus after the bits are distributed to the output buffers as described hereinafter. Assuming that a correct framing signal is detected, output common control 125 provides an enabling signal to terminal STP of output buffer 115. This enables output buffer 115 to accept clock pulses from clock 121 by way of terminal CL–1. These clock pulses are utilized by output buffer 115 to read and register the bits applied to the input thereof by bus 120 and to maintain a count of the applied bits. Accordingly, since output buffer 115 is started immediately after the framing signal, the character bits applied by input buffer 105 are read and registered by output buffer 115 for subsequent application to data output lead 111.

When the count of the bits applied by bus 120 corresponds to the number of bits of the characters of the code dedicated to the first buffers plus the flag bit, the reading and registering of the bits are concluded and output buffer 115 provides an enabling signal by way of terminal STS to terminal STP of buffer 116. Accordingly, buffer 116 starts to count, read and register the bits of the character applied to bus 120 by input buffer 106. In a similar manner, each of the output buffers sequentially counts, reads and registers the data bits of the corresponding input buffer until output buffer 118 concludes its counting and registration. Thereupon output buffer 118 applies a signal by way of its terminal STS to ouput common control 125. This permits output common control 125 to again read bus 120 to detect the framing signal. Accordingly, at the conclusion of the distributing cycle, output common control 125 examines the framing signal and assuming the framing signal is correct, initiates a new distributing cycle.

Assuming now that an input buffer has not received a code character, the buffer had applied an inverted flag bit to bus 120 corresponding to the prolonged condition of the incoming line. Since the corresponding output buffer is concurrently receiving the data bits, in the event that a code character is not received therein the output buffer examines the flag bit and applies the corresponding prolonged condition to its outgoing line. It is noted that the counting circuit in the output buffer maintains the appropriae count of the number of incoming bits. Accordingly, the distribution cycle is maintained and the next output buffer is enabled to read the appropriate succeeding character.

Assuming now after a cycle of bit distribution to the output buffers, output common control 125 examines the next bit on bus 120 and finds that it is an incorrect signal indicating loss of synchronization, output common control 125 applies a disabling potential to all of terminals DD in output buffers 115 through 118. This has the effect of precluding registration of any of the data bits. In addition, output common control 125 passes a disabling potential to terminal DIS of the first output buffer 115. This disables the counting circuit in output buffer 115, precluding the counting of the bits on bus 120. Output common control 125 then proceeds to examine the next successive bit applied to bus 120 and each successive bit thereafter until a correct framing signal is detected. Thereupon output common control 125 removes the disabling potential from terminal DIS of output buffer 115. Accordingly, output buffer 115 proceeds to count the bits applied to bus 120. Registration of the bits is precluded, however, since a disabling potential is still applied to terminal DD.

After the appropriate number of bits are counted by output buffer 115, output buffer 116 is signaled, as previously described, to proceed to count the next sequence of bits. Accordingly, the output buffers provide a count of the bit distribution cycle without registering any of the bits applied to bus 120. It is noted that during this cycle each of the outgoing lines are maintained in the signal condition corresponding to the convention of the output line when synchronization was lost.

At the conclusion of the bit distribution cycle, output buffer 118 again signals output common control 125 and output common control 125 again examines the bit applied to bus 120. Assumming the second bit is a correct framing bit, another distribution counting cycle is initiated although bit registration is still precluded. When this cycle is completed, output common control 125 is again enabled and in the event that the third bit is a correct framing bit, it is presumed that the system is again back in synchronization and the disabling potentials applied to the DD terminals of the output buffers are removed and normal operation is resumed.

Input data buffers

A typical input data buffer is generally indicated by block 201 in FIGS. 2 and 3. Extending to input data buffer 201 is data input line 202. As previously described, data line 202 is dedicated to a predetermined data code which, it is assumed, is a start-stop code containing a parity bit, in this case for providing even parity.

Input data lead 202 extends to the CLEAR input of SM flip-flop 241 which, as described hereinafter, is normally in a CLEAR condition. In addition, input data lead 202 is connected to the first stage of the input data register generally indicated by the block 208 and to an input of oscillator control circuit 203.

Oscillator control circuit 203 is a bistable device having one input thereof extending to data input lead 202 and another input thereof extending to lead 209. The output of oscillator control circuit 203 is connected to oscillator 204. When a negative transition such as a spacing start signal is received over input lead 202, oscillator control 203, in response thereto, is operated to one of its bistable states. In this state oscillator control 203 provides an enabling potential to oscillator control 204, and the action of oscillator 204 is initiated to provide at the output thereof pulses at the bit rate of the incoming signals on data input lead 202. These bit pulses are utilized as shift pulses for input register 208. Oscillator control 203 remains in this state until a negative transition is received over input lead 209 restoring oscillator control 203 to its initial state, and in turn disabling oscillator 204 to terminate the application of shift pulses to input register 208.

As previously described, data input lead 202 extends to input register 208. Input register 208 has a plurality of stages numbered in FIG. 2 in accordance with the elements of the start-stop code dedicated for input line 202. As described hereinafter, all of the stages are normally in the CLEAR condition. Viewed from right to left in FIG. 1, the first stage of input register 208 is identified as stage STP to correspond to the start bit of the start-stop code. The succeeding stages are identified as stages 1 through N, and are equal in number to the intelligence elements of the start-stop code. Stage P in input register 208 follows stage N and corresponds to the parity bit in the start-stop code and stage SP corresponds to a stop element although the start-stop code dedicated to input lead 202 may contain more than one stop element.

With data input lead 202 extended to input register 208 and more particularly to stage SP by way of lead 206, a combination of the application of a marking condition by data input lead 202 to stage SP and the transition of the output of oscillator 204 from a low condition to a high condition clears stage SP. Conversely, when an input spacing condition is applied to stage SP together with a shift pulse transition, stages SP is SET. Accordingly, stage SP stores a spacing bit therein when it is SET and stores a marking bit therein when it is CLEARED. Similarly, all other stages of input reigster 208 store spacing bits in the SET condition and marking bits in the CLEAR condition.

Assuming now that a start-stop character is received from data input line 202, when the start bit is received the consequent negative transition of the line drives oscillator control 203 to the first bistable state as previously described, thereby enabling oscillator 204. Oscillator 204 in turn starts to operate providing a shift pulse at the theoretical midpoint of the start element and, since it is operated at the bit rate of the incoming channel, at the theoretical midpoint of each succeeding element. Accordingly, at the theoretical midpoint of the start element, stage SP of input reigster 208 is SET. When the first intelligence element is received and at the theoretical midpoint thereof, oscillator 204 produces the next shift pulse driving stage SP into the condition corresponding to the first element and entering the start pulse in stage P by setting the stage. Similarly, each of the succeeding intelligence elements, the parity element and the stop bit is entered into stage SP of input register 208, and each prior element is shifted down through the register until the start bit is stored in stage STP, the intelligence bits are stored in stages 1 through N, the parity bit is stored in P and the first stop bit is stored in stage SP.

The entering of the start bit into stage STP transfers the condition of the stage from the CLEAR to a SET condition. This drives the "0" or CLEAR output terminal of stage STP from the high voltage to the low voltage condition. The consequent negative transition at the "0" output of stage STP is passed to lead 209 and thus to oscillator control 203. Accordingly, as previously described, oscillator control 203 is restored to the initial bistable state disabling oscillator 204 and thus terminating the application of shift pulses to input register 208. Thus, the entering of data bits into input register 208 is terminated until the next negative or spacing condition transition on data input line 202.

When the start pulse is entered into stage STP, driving the stage from a CLEAR to the SET condition, the SET or "1" output terminal of stage STP goes from a low voltage to a high voltage condition. This high condition is provided to delay circuit 211 by way of lead 210, and after a predetermined delay, is then provided to one input terminal of AND gate 212. The other input terminals of gate 212 extend to leads 214 and 215.

Lead 214 is the "not" clock lead which extends to the output of clock 401, FIG. 4. Clock 401 provides at its output clock lead conventional clock pulses and its output "not" clock lead inverted clock pulses, that is, the pulses on the "not" clock lead correspond to the interpulse periods on the clock lead. The pulse repetition rate of clock 401 determines the bit rate of the common bus and is therefore slightly in excess of the cumulative signaling rate required to acommodate the signals received on all the input channels.

As described above, lead 214 applies a positive condition to gate 212 during the interpulse clock period, thus enabling gate 212 during this interpulse period. This is arranged to provide that the subsequent operation of input register 208 and the readout thereof does not occur during other operations of the input data buffer 201 which operations are initiated by the clock pulses.

Returning now to gate 212, input lead 215 extends to the "0" or CLEAR output of RM flip-flop 321. As described hereinafter RM flop-flop 321 is in the CLEAR condition when data is not being read out onto the common bus. Assuming therefore that data is not being read out, RM flip-flop 321 is in the CLEAR condition, lead 215 is in the high condition and gate 212 is enabled. Accordingly, the output of gate 212 is driven to the high condition in response to the delayed transition from stage STP. This condition is passed to the CLEAR input of stage STP restoring it to the CLEAR condition.

The restoration of stage STP to the CLEAR condition drives the "0" output thereof to the high condition. This positive transition is applied to monopulser 218 and monopulser 218, in turn, generates a positive pulse at the output thereof. This positive pulse is passed by way of lead 219 to the CLEAR inputs of stages 1 through N, P and SP in input register 208. Accordingly, all of the stages of input register 208 are restored to the CLEAR condition in preparation for the next reception of signals from data input lead 202.

The output pulse provided by monopulser 218 signals the completion of the storage of the input start-stop character in input register 208 and provides the readout or gating pulse. This gating pulse is passed from the output of monopulser 218 to lead 220 and thence to a gate generally indicated by block 301, FIG. 3. In general, gate 301 functions to read out the character from input register 208 into the bus register generally indicated by block 320.

Bus register 320 is viewed from right to left in FIG. 3 includes stages 1 through N corresponding to stages 1 through N in input register 208 and stage F. Stages 1 through N correspond to the data bits in the start-stop code and stage F corresponds to a flag bit added to the code character as described hereinafter. The flag bit entered at stage F is dependent upon several conditions such as the parity bit, the condition of data input line 202 and certain of the codes received therefrom.

Returning now to gate 301, it is noted that the gate includes AND gates 311 through 314 and 315 through 318. Considering first gates 311 through 313, one input of each of these gates extends to lead 220 which, as previously described, provides the gating pulse. The other input leads to gates 311 through 313 extend by way of leads 221 through 223 to the "1" outputs of stages 1 through N. The outputs of gates 311 through 313 then extend by way of OR gates 302 to 304 to the SET inputs of stages 1 through N of bus register 320. Accordingly, gates 311 through 313 and the intermediate gates therein, not shown, function in response to the gate pulse on lead 220 to set stages 1 through N of bus register 320 in the event that corresponding stages of 1 through N of input registers 208 are SET. Thus, a spacing bit stored in a stage in input register 208 is read out and stored in a corresponding stage in bus register 320.

Gate 301 also includes AND gates 315 through 317, and these gates similarly have one input thereof connected to lead 220. The other inputs to gates 315 through 317 extend by way of leads 231 through 233 to the "0" outputs of stages 1 through N of input register 208. Since the outputs of gates 315 through 317 pass through OR gates 306 through 308 to the CLEAR inputs of stages 1 through N of bus register 320, gates 315 through 317 function to pass marking bits in stages 1 through N of input register 208 to corresponding stages in bus register 320. As described hereinafter, gates 314 and 318 operate to insert the appropriate flag bit in stage F of bus register 320. Summarizing, therefore, it is seen that after the start-stop code character is entered in input register 208, and when bus register 320 is not being read out, input register 208 is read out through gate 301 into bus-register 320 and register 208 is restored to the CLEAR condition to await the next signal from data input line 202.

The readout of bus register 320 onto the common bus occurs after the input data buffer prior to buffer 201 completes its readout or, in the event that input data buffer 201 is the first buffer, then after the common control applies its framing signal to the common bus. Upon the completion of the readout of the prior buffer, or where data buffer 201 is the first buffer, then upon the application of the framing signal to the bus a positive pulse is received on terminal STP and thus applied to lead 322. The positive pulse on lead 322 is extended to the SET input of RM flip-flop 321, placing the flip-flop in the SET condition, it being recalled that the flip-flop is in the CLEAR condition prior to readout. In addition, the pulse on lead 322 is passed by way of lead 324 to the CLEAR input of M flip-flop 323. M flip-flop 323, which is normally in the SET condition as described hereinafter, is thus placed in the CLEAR condition. It is noted at this time that M flip-flop 323 has an output extending to bus register 320 and more particularly to stage F. It is arranged that when shift pulses are applied to stage F, the stage is driven to a condition in accordance with the condition of M flip-flop 323.

Recalling now that the start of readout pulse on lead 322 sets RM flip-flop 321, the "0" output thereof is driven to a low voltage condition, which condition is applied to output terminal CK and to lead 215. As previously described, the low voltage condition on lead 215 disables gate 212 to preclude the readout of the input register. The function of output terminal CK will be described hereinafter.

With RM flip-flop 321 in the SET condition, the "1" output terminal thereof is driven to the high condition, which condition is applied to AND gate 326. Gate 326 comprises the readout gate and with RM flip-flop 321 SET, readout gate 326 is enabled to read out the conditions of the first stage in bus register 320. Accordingly, the output of gate 326 will go to the high condition when the first stage is CLEAR and to the low condition when the first stage is SET. Thus, the storage of a mark bit in the first stage of bus register 320 applies a positive condition to lead 328 and then to terminal BI which, as described hereinafter, is connected to the common bus.

The "0" output terminal of RM flip-flop 321 is also connected to an input of OR gate 325. Recalling now that RM flip-flop 321 is normally in the CLEAR condition and the "0" output thereof is in the high voltage condition, this high voltage condition is thus passed through OR gate 325 to lead 340. The other input to gate 325 is connected to the clock output by way of lead 327. With RM flip-flop 321 in the CLEAR condition, however, output lead 340 of lead 325 is maintained in the high condition whereby the application of the clock pulses thereto is precluded.

When RM flip-flop 321 is SET and the "0" output thereof is driven to the low voltage condition, the high voltage condition thus applied to lead 340 is removed. Accordingly, clock pulses applied by way of lead 327 are now passed by gate 325 to lead 340.

It is noted here, as described hereinafter, that the high condition applied by RM flip-flop 321 is removed simultaneously with the application of the leading edge of the clock pulse to lead 327. Accordingly, the first low voltage to high voltage transition on the lead 340 does not occur until the initiation of the next subsequent clock pulse. RM flip-flop 321, however, has been SET, and consequently gate 326 has been enabled for a full bit period prior to this transition. Accordingly, the condition of the first stage of bus register 320 is read out before the transition occurs on lead 340. This first bit is applied by way of lead 328 and terminal BI to the common bus.

Lead 340 extends to the shift pulse input of bus register 320 and to the SET input of M flip-flop 323. The above-described next subsequent shift pulse, that is, the first low to high transition on lead 340 thus sets M flip-flop 323 and provides the first shift pulse for bus register 320. This shift pulse therefore inserts the marking bit from M flip-flop 323 into stage F, shifts the flag bit from stage F to stage N and shifts the conditions from each stage to each prior stage whereby the condition in stage 2 is shifted to stage 1. The second bit is thus read out of bus register 320 through gate 326 to the common bus.

Upon the application of the next subsequent shift pulse to bus register 320, each bit is similarly shifted forward. Since M flip-flop 323 is now in the SET condition, however, a spacing bit is read into stage F. Simultaneously, the marking bit initially read into stage F is shifted into stage N.

For each succeeding shift pulse, the marking bit initially stored in M flip-flop 323 and read into stage F is passed from stage N to succeeding stages. In addition, with M flip-flop 323 SET, spacing bits are read into stage F and shifted down through the stages to follow the marking bit. Accordingly, as the code character is shifted down through bus register 320 followed by the flag bit, a marking bit is shifted down immediately following the flag bit, and the stages subsequent thereto fill up with spacing bits. Thus, the code character continues to be shifted down in bus register 320 until the flag bit enters stage 1, the marking bit enters stage 2 and the stages subsequent thereto are filled with spacing bits.

At the completion of the readout of the flag bit by gate 326, the next shift pulse transition is applied to lead 340, moving the marking bit to stage 1 and filling all subsequent stages with spacing bits. The "1" output terminals of all subsequent stages together with "1" output of M flip-flop 323 are therefore in the high voltage condition. These terminals are all connected to AND gate 345. The output of AND gate 345, therefore, goes to the high voltage condition, which condition is applied to the CLEAR input of RM flip-flop 321. RM flip-flop 321 is therefore CLEARED, disabling gate 326, reapplying the high voltage potential through OR gate 325, reenabling gate 212 and reapplying the high voltage condition to terminal CK. It is noted that this clearing of RM flip-flop 321 occurs simultaneously with the application of the leading edge of the shift pulse since this shift pulse shifted the marking bit out of stage 2 to enable gate 345 to clear RM flip-flop 321. Thus, lead 340 which was in the high voltage condition in response to the shift pulse is maintained in the high voltage condition by RM flip-flop 321.

The output terminal of RM flip-flop 321 is also connected to monopulser 346. When RM flip-flop 321 is CLEARED, the positive voltage transition at the "0" output thereof is applied to monopulser 346 which generates at its output thereof a positive pulse. This positive pulse is applied through lead 347 to output terminal STS.

As previously described, terminal STS of each input data buffer is connected to terminal STP of each subsequent input buffer with the exception of the last buffer wherein terminal STS is connected to common control. Accordingly, upon the termination of readout and the restoring of RM flip-flop 321 to the CLEAR condition, monopulser 346 sends a positive pulse to the STP terminal of the next subsequent buffer or to common control. This initiates the readout of the next subsequent buffer in the same manner as previously described with respect to input data buffer 201.

The positive pulse at the output of monopulser 346 is also passed by way of lead 348 to gates 242 and 244, FIG. 2. As previously described, SM flip-flop 241 is normally in the CLEAR condition. With the "0" output terminal thereof connected to gate 242, this gate is enabled. Conversely, with the "1" output terminal thereof connected to gate 244, this latter gate is disabled. Accordingly, in the normal condition, the pulse on lead 348 is passed through gate 242 to lead 243. Lead 243, in turn, is connected to OR gate 305 and to OR gates 306 through 308. Since the output of OR gate 305 is connected to the SET input of stage F and the outputs of OR gates 306 to 308 are connected to the CLEAR inputs of stages 1 to N in bus register 320, stage F is placed in the SET condition and stages 1 to N are restored to the CLEAR condition. Accordingly, at the termination of readout, stage F is normally in the SET condition and stages 1–N of bus register 320 are normally restored to the CLEAR condition in preparation for the next reading of the character in input register 208. In addition, with RM flip-flop 321 in the CLEAR condition, it is ready to respond to another pulse from terminal STP to again read out the character stored in bus register 320 to the common bus.

Summarizing the above-described operations, the information elements of the code character received and stored by input register 208 are read out and transferred to bus register 320. In the process the start and stop elements are stripped off, the parity element is examined as described hereinafter, and a new flag bit is inserted in bus register 320. Thereafter, in response to a signal from the prior input data buffer or from common control if buffer 201 is the first channel, the intelligence elements and the flag bit are read out onto the bus, and, at the conclusion thereof, the subsequent input data buffer is signaled to initiate its readout. Accordingly, each input buffer is assigned a plurality of sequential time slots, the number of time slots corresponding to the number of intelligence elements for the code character dedicated to the input lead for the buffer plus one flag bit. Thus, for each readout cycle the input buffers sequentially read out a character at a time to the bus.

Flag bit insertion

As previously indicated, the flag bit entered in bus register 320 depends on the input code characters, the condition of the input line and/or the parity bit received by input register 208. In the event that the input line is in the idle marking condition, a "1" or spacing bit will invariably be inserted in stage F of bus register 320. This is to insure that the continuing condition wherein "0" or marking bits are contained in stages 1 through N, a spacing or "1" bit will be continuously inserted in stage F to indicate the idle line condition. In the event, however, that a "rub out" or "letters" character is received, which character contains all marking intelligence elements, then a "0" or marking bit will be inserted in stage F. Thus, a "rub out" will be clearly distinguishable from an idle line condition.

When the incoming line is in a prolonged "break" or spacing condition, then a "0" bit is inserted in stage F. Thus, during the "break" condition, "1" or spacing bits are read into stages 1 through N while a "0" or marking bit is inserted in stage F. When a "blank" character is received wherein all intelligence elements are spacing elements, a "1" or spacing bit is inserted in stage F. This prmits the "blank" character to be distinguished from the prolonged "break" or spacing condition.

During normal signaling sequences, a "1" bit is inserted in stage F when the imput start-stop code parity bit is "0" or marking, and a "0" bit is inserted in stage F when the parity bit is "1" or spacing. This normal signaling condition involves all situations excluding "idle," "break," "letters" character or "blank" character receiving situations.

Assuming now that input line 202 is idle, oscillator control 203 does not enable oscillator 204. Accordingly, no spacing bit is inserted in input register 208, and monopulser 218 therefore does not provide any gating pulse to lead 220. It is recalled that, upon the completion of readout, monopulser 346 applies a pulse to lead 348 which pulse passes through gate 242 to lead 243. This pulse is then applied to gates 305 through 308 inserting marking bits in stages 1 through N and a spacing bit in stage F. Thus, with input lead 202 in the idle condition precluding the application of a gating pulse to lead 220, stages 1 through N are maintained in the CLEAR condition, and stage F is maintained in the SET condition. Accordingly, upon the next readout of bus register 320, marking bits corresponding to stages 1 through N will be read out followed by the spacing flag bit stored in stage F. At the completion of readout, monopulser 346 will again pass a pulse through gate 242 and marking bits will again be inserted in stages 1 through N and a spacing bit will be inserted in stage F.

Assuming now that a "rub out" or "letters" character is received, the start element of the character operates oscillator control 203 to enable oscillator 204. Accordingly, after the character is completely read into input register 208 and the start element is inserted in stage STP, monopulser 218 is operated, as previously described, to apply a gate pulse to gate 301. The intelligence elements of the character are thus read from input register 208 into bus register 320. Since all the intelligence elements of the "letters" character are marking, the "0" outputs of stages 1 through N in input register 208 are in the high condition. These outputs are all connected to gate 251 whereby the output thereof goes to the high condition which condition is passed through OR gate 252 to lead 253. Lead 253 in turn extends to an input of AND gate 318 in gate 301. Since the other input to AND gate 318 is connected to lead 220, the high condition on lead 253 enables gate 318 to pass the gate pulse therethrough and through OR gate 309 to the CLEAR input of stage F of bus register 320. Accordingly, when a "rub out" or "letters" character is received, the marking elements are inserted in bus register 320, and a marking flag bit is also inserted in stage F.

When a prolonged "break" or spacing condition is received, the initial mark to space transition operates oscillator control 203 and oscillator control 203 in turn enables oscillator 204 to apply shift pulses to input register 208. This results in the insertion of spacing bits in input register 208 since input line 202 is maintained in the spacing condition. Accordingly, at the conclusion of one character interval, a simulated spacing start bit is fed into stage STP and monopulser 218 thus applies a gating pulse to lead 220. Gate 301 therefore reads out the spacing bits in input register 208 and inserts them in bus register 320.

With the "break" condition in input lead 202, the simulated character inserted in input register 208 does not include a stop element. Accordingly, a spacing bit is inserted in stage SP of input register 208. This drives the "1" output thereof to the high condition, which condition is passed through OR gate 252 to lead 253. Accordingly, gate 318 is enabled upon the application of the gating pulse to insert a marking bit in stage F. Thus, in response to the initiation of the "break" signal, spacing bits are inserted in stages 1 through N of bus register 320 and a marking bit is inserted in stage F.

Since the "break" condition is recognized by input register 208 as a stream of spacing bits, the "1" outputs of stages 1 through N are in the high condition. These "1" outputs are all connected to gate 255 providing a high condition at the output thereof. This high condition is fed to one input of AND gate 258. The other two inputs to AND gate 258 are connected to the "1" outputs of stages P and SP in input register 208. Since only spacing bits have been fed to input register 208, these "1" outputs are also in the high condition. Accordingly, the output of gate 258 also goes to the high condition, which condition is fed to one input of AND gate 259. Since the other input to AND gate 259 is connected by way of lead 230 to lead 220, the gating pulse produced by monopulser 208 is applied by gate 259 to the SET input of SN flip-flop 241. Accordingly, the reception of the initial transition of the "break" signal affects the setting of SN flip-flop 241. With this flip-flop SET, the "0" output goes to the low condition, disabling gate 242, and its "1" output goes to the high condition, enabling gate 244.

It is recalled that a "break" signal constitutes a prolonged spacing condition. Accordingly, when the previously described character interval is terminated, the stages of input register 208 are CLEARED and oscillator control 208 is restored to its initial condition as previously described. Since input lead 202 stays in the spacing condition, there is no subsequent mark to space transition to enable oscillator control 203. Accordingly, oscillator 204 is not reenabled to apply more shift pulses to input register 208. Thus, after the first character interval, subsequent spacing bits are not inserted in input register 208 and monopulser 218 is not operated to generate subsequent gating pulses.

Recalling now that at the conclusion of readout from bus register 320 monopulser 346 is operated, the output pulse thereof applied to lead 348 cannot pass through gate 242 since this gate is disabled by the clearing of SN flip-flop 241. With gate 244 enabled, however, the pulse on lead 348 is applied therethrough to lead 245. Lead 245 in turn is connected to OR gate 309 whereby the pulse applied thereto clears stage F. In addition, lead 245 is connected to OR gates 302 through 304, setting stages 1 through N in response to the pulse on lead 245. Thus, although after the readout of the "break" signal subsequent gating pulses are not applied to gate 301, the setting of SN flip-flop 241 and the consequent enabling of gate 244 functions to insert spacing bits in stages 1 through N of bus register 320 and insert a marking bit in stage F. Accordingly, upon each subsequent readout, the character inserted in bus register 320 corresponds to the "break" condition.

At the conclusion of the "break" condition, input lead 202 restores to the marking condition. This space to mark transition is applied to the CLEAR input of SN flip-flop 241. SN flip-flop 241 is thus restored to the CLEAR condition disabling AND gate 244 and reenabling AND gate 242. The circuit is thus restored to the initial condition prior to the reception of the "break" signal.

Assuming now that a "blank" character is received, the reception of the start element of the "blank" character enables oscillator control 203 which in turn enables oscillator 204. Accordingly, the "blank" character is read into input register 208, and the insertion of the start element in stage STP operates monopulser 218. The operation of monopulser 218 provides a gate pulse to gate 301, and gate 301 reads all the spacing bits out of input register 208 and into bus register 320.

The "blank" character includes a stop pulse whereby stage SP provides a low condition to AND gate 258 thereby disabling the gate and provides a low condition to OR gate 252. Since all the intelligence elements are spacing, gate 255 provides a high condition at the output thereof. The high condition at the output of gate 255 is applied to inverter 257 which in turn passes a low condition to AND gate 256 disabling this gate. Accordingly, gate 256 applies a low condition to OR gate 252. Since the intelligence elements are not marking, gate 251 provides a low condition at the output thereof as previously described, and this low condition is applied to OR gate 252. Thus, all of the inputs to gate 252 are in the low condition, and this low condition is passed to lead 253. Lead 253 in turn is connected to the input of inverter 350, and inverter 350 thus applies a high condition to the input of gate 314. Accordingly, gate 314 is enabled, and with the other input thereof connected to lead 220, gate 314 passes the gate pulse therethrough and through OR gate 305 to the SET input of stage F of bus register 320. Accordingly, in response to the reception of a start-stop "blank" character, spacing bits are inserted in stages 1 through N of bus register 320, and a spacing flag bit is inserted in stage F.

Assuming that a start-stop code character is received other than "blank" or "letters," neither gates 251 nor 255 are enabled as previously described. With the output of gate 255 in a low condition, however, inverter 257 applies a high condition to AND gate 256 thereby enabling the gate.

If the start-stop character received contains a marking parity bit, stage P of input register 208 is CLEAR. Accordingly, a low condition at the one input thereof is applied to AND gate 256, and AND gate 256 applies a low condition to OR gate 252. Since the other inputs to OR gates 252 are also in the low condition, as previously described, lead 253 goes to the low condition and inverter 350 enables AND gate 314 as previously described. Thus, the gate pulse is passed by gate 314 through gate 305 to set stage F. Accordingly, when a marking parity bit is received by input register 208, a spacing flag bit is inserted in stage F of bus register 320.

When a spacing parity bit is received by input register 208, the "1" output of stage P goes high, enabling AND gate 256 since inverter 257 is applying a high condition to the other input of AND gate 256. As previously described, the high condition at the output of gate 256 is passed by way of OR gate 252 and lead 253 to gate 318. Gate 318 therefore is enabled to pass the gating pulse through OR gate 309 to the CLEAR input of stage F of bus register 320. Thus, when a spacing parity bit is received by input register 208, a marking flag bit is inserted in stage F of bus register 320.

Input common control

Referring now to FIG. 4, lead 403 constitutes the common bus. Bus 403 is connected to the output of OR gate 402. The inputs to OR gate 402 are connected to the BI terminals of the input data buffers and to input common control 406. Accordingly, OR gate 402 passes the data readout from the input data buffers to bus 403, and, in addition, passes a framing pulse from input common control 406 to bus 403 as described hereinafter.

As previously described, the input common control shown generally as block 406 in FIG. 4, inserts the framing bit at the conclusion of the readout of all the input data buffers. This framing bit is alternately marking and spacing. Thus, at the conclusion of any readout cycle, if the framing bit is a marking pulse, the framing bit at the conclusion of the next readout cycle is a spacing pulse, and then at the conclusion of the next readout cycle, another marking pulse.

It is recalled at the conclusion of the readout of the last buffer the monopulser corresponding to monopulser 346 applies a pulse to its output terminal STS–N. It is also recalled that as each input buffer concludes its readout the RM flip-flop corresponding to flip-flop 321 is cleared, driving the CK terminal to the high condition. Accordingly, after the readout of the input buffers all of the CK terminals are in the high condition, and a pulse is applied to the STS terminal of the last input data buffer.

Referring now to FIG. 4, it is seen that the leads extending to the CK terminals are connected to AND gate 414 in input common control 406. In addition, the lead extending to terminal STS–N is connected to AND gate 415. With all the CK leads in a high condition, the output of gate 414 goes high, enabling AND gate 415. Accordingly, the pulse from terminal STS–N passes through AND gate 415 to the CLEAR input of SW flip-flop 408.

With SW flip-flop 408 driven to the CLEAR condition, the "1" output terminal goes to the low condition, removing the high condition previously applied to OR gate 411. Concurrently, the "0" output of SW flip-flop 408 goes to the high condition, and this transition is applied to the toggle input of SB flip-flop 410. The high condition at the "0" output of SW flip-flop 408 is also extended to one input of AND gate 409.

The application of the positive transition to the toggle input of SB flip-flop 410 transfers the state of the flip-flop. Thus, if the flip-flop was in the CLEARED condition, it is now driven to the SET condition, and, conversely, it is driven to the CLEAR condition if it previously was in the SET condition. Assuming that SB flip-flop 410 is driven to the CLEAR condition, the resultant high condition at its "0" output is applied to AND gate 409. Accordingly, the output of AND gate 409 goes to the high condition, which condition is applied to OR gate 402. The application of the high condition to gate 402 is passed therethrough whereby a marking framing bit is applied to bus 403. Conversely, if SB flip-flop 410 is driven to the SET condition, the "0" output thereof is in the low condition, and the output of gate 409 is low. Accordingly, a low condition is applied to gate 402, passing a spacing framing bit to bus 403.

Upon the initiation of the next clock pulse by clock 401, a positive transition is applied by way of the clock lead to OR gate 411. Since SW flip-flop 408 has been cleared and the positive condition applied by way of its "1" output to OR gate 411 has been removed, a positive clock pulse transition is passed to the SET input lead of SW flip-flop 408. The consequent setting of the flip-flop drives its "1" output back to its high condition and monopulser 416 responds by providing a positive pulse to output lead STP–1. This lead, as previously described, extends to the first input data buffer, and functions to set the RM flip-flop therein to initiate its readout cycle. With SW flip-flop 408 now SET, its "0" output goes to the low condition disabling gate 409. This terminates the framing pulse provided by the input common control 406.

At the conclusion of the readout cycle of the input buffers, all the CK terminals are again in the high condition and the last input buffer applies a pulse to the STS–N terminal. Accordingly, SW flip-flop 408 is again CLEARED, the state of SB flip-flop 410 is reversed and another framing bit, having a condition opposite the prior framing bit, is applied to bus 403. Thereafter, on the next clock pulse, the framing bit is terminated and the first input buffer is started to initiate the next readout cycle.

Output common control

The signals supplied to bus 403 are distributed to the several output data buffers and the output common control generally indicated by block 418. Output common control 418 functions to determine whether the framing bit comprises alternate marking and spacing bits and, if the framing bits are correct, initiate the operation of the first output data buffer to read the first character in the scanning cycle. In the event that the framing bits are not alternated, output common control 418 is arranged to scan successive bits until the proper alternating sequence is detected. This "slipping" of time slots functions to restore proper framing.

The operation of output common control 418 is started when the last output data buffer receives its data character. The last output data buffer thereupon sends a signal to output common control 418 by way of terminal STS–N, as described hereinafter. This signal is applied by way of lead 419 to set ECC flip-flop 420. In addition, since lead 419 extends to the toggle input of ST flip-flop 421, this latter flip-flop is reversed in its condition. ST flip-flop 421 remembers the alternate states of the framing bit. With ST flip-flop 421 in its SET condition, a marking framing bit is anticipated whereas when ST flip-flop 421 is in its CLEAR condition, a spacing framing bit is expected. In accordance therewith, with ST flip-flop 421 SET and a marking framing bit received by way of bus 403, the high condition of output terminal "1" of ST flip-flop 421 enables gate 426 to pass the marking framing bit therethrough to OR gate 428. OR gate 428 in turn applies an enabling potential to the SET input of stage A of shift register 430. Although stage A is not set until a shift pulse is applied thereto, the enabling of the SET input indicates that the proper framing bit has been received. Conversely, with ST flip-flop 421 CLEARED, and a spacing framing bit received from bus 403, output terminal "0" of flip-flop 421 enables gate 427. Inverter 425 inverts the spacing framing bit, passing it through enabled gate 427 and OR gate 428 to enable the SET input of stage A of shift register 430. Thus, it is indicated that the correct framing bit is received.

Returning now to the setting of ECC flip-flop 420, the consequent high condition at output terminal "1" thereof enables gate 442. Thereafter, the "not" clock impulse is passed through gate 442 and OR gate 443 to provide a shift pulse to shift register 430. Accordingly, the previously described enabling of the SET input of stage A functions with the shift pulse to set stage A.

Upon the next occurrence of the clock impulse, OR gate 422 applies an enabling pulse to the CLEAR input of ECC flip-flop 420. The "0" output thereof is thus driven to the high condition, and monopulser 455 in response thereto applies a pulse to output terminal STP–1. This signals the termination of the framing pulse, and the pulse on terminal STP–1 initiates the operation of the first output data buffer to read the first data character in the cycle. With ECC flip-flop 420 in the CLEARED condition, a high condition is also applied to OR gate 422. This renders the output of OR gate 422 unresponsive to the clock pulses. In addition, with ECC flip-flop 420 CLEARED, AND gate 442 is disabled to block the "not" clock impulses to shift register 430.

In the event that synchronism is lost and incorrect framing pulses are received, output common control 418 examines the subsequent time slots until a bit having the correct condition is detected. This action, however, is not initiated until two successive incorrect framing bits are detected.

Assuming now that ST flip-flop 421 is SET by a pulse over lead 419 and a spacing framing bit is received, gate 426 is enabled, but a high condition pulse is not applied thereto by bus 403. Accordingly, the output of OR gate 428 goes to the low condition whereby inverter 429 provides an enabling signal to the CLEAR input of stage A of shift register 430. Accordingly, when the "not" clock impulse is applied through gates 442 and 443, stage A is CLEARED. Conversely, if ST flip-flop 421 is in the CLEAR condition in anticipation of a spacing framing bit and a marking framing bit is received, gate 427 is enabled, as previously described, but inverter 425 applies a low condition thereto. Accordingly, the output of OR gate 428 is in the low condition, and inverter 429 applies an enable potential to the CLEAR input of stage A. Thus, stage A is CLEARED in the event that an improper framing bit is received.

When the next successive framing bit is anticipated, a pulse is again applied to lead 419 to the toggle input of ST flip-flop 421 thereby reversing its condition. If, at this time, the correct pulse is detected, stage A will be SET, and the circuit action will continue in the normal manner. In the event, however, that an incorrect framing bit is detected, an enabling potential will be applied by inverter 429 to the CLEAR input of stage A in the same manner as previously described. Accordingly, upon the reception of the "not" clock impulse, the shift pulse applied by OR gate 443 places stage A in the CLEAR condition and shifts the previous CLEAR condition of stage A to stage B.

With both stages A and B of register 430 in the CLEAR condition, the "0" output terminals thereof go to the high condition to enable AND gate 450. Gate 450 in turn is connected to one input of each of AND gates 451 and 452. The other input to each of AND gates 451 and 452 are connected to the clock lead. Accordingly, the next subsequent clock impulse enables AND gate 451 to clear DD flip-flop stage 439 and set DS flip-flop stage 434.

The clearing of DD flip-flop 439 brings its "1" output terminal to a low condition. This low condition is applied to terminal DD which terminal extends to all the output data buffers. As described hereinafter, with terminal DD in the low condition, the input gate to the registers in each of the output data buffers is disabled, precluding the registration of subsequently received characters.

Returning now to the setting of DS flip-flop 434, output terminal "0" is driven to the low condition. This low condition is extended to terminal DIS which terminal extends to the first output data buffer. As described hereinafter, the application of the low condition to terminal DIS disables the first output data buffer whereby the buffer cannot initiate a count of the incoming data bits, and therefore is precluded from providing the stepping of the readout cycle and the subsequent enabling of the second output data buffer. Accordingly, with DS flip-flop 434 SET, the readout cycling of the output data buffers is halted.

The setting of DS flip-flop 434 also drives its "1" output to the high condition to enable gate 444. Thus, when the "not" clock impulse is received this pulse will be passed by gate 444 to OR gate 443 to provide a shift pulse.

The clock pulse which set DS flip-flop 434 and cleared DD flip-flop 439 also cleared ECC flip-flop 420 as previously described. With the first output data buffer disabled, however, the consequent pulse provided by monopulser 455 to enable the first output data buffer does not initiate the readout cycle. The first bit, however, although not registered by the first output data buffer, is examined by gates 426 and 427 and since ST flip-flop 421 remains in its prior condition. In the event that this still is not a proper framing bit, the next "not" clock pulse with gate 444 enabled again clears stage A of shift register 430. Accordingly, output common control 418 maintains the output data buffers disabled and slips another data bit. The next data bit is therefore again examined, and this process is repeated.

Assuming now that a data bit corresponding to a proper framing bit is detected, an enabling potential is applied to the SET input of stage A. The "not" clock impulse then applied through gate 444 and OR gate 443 sets stage A, driving the output thereof to the high condition. This enables gate 433 which, upon the reception of the clock impulse, clears DS flip-flop 434. With DS flip-flop 434 CLEARED, the counting of the first output data buffer is enabled and the output data buffers maintain a count of the readout cycle although the registration of the characters is precluded since DD flip-flop 439 is maintained in the CLEAR condition. In addition, with DS flip-flop 434 CLEARED, the "1" output thereof goes to the low condition, disabling AND gate 444. The application of shift pulse to shift register 430 is therefore terminated, thereby concluding the detecting of the data bits received from bus 403.

At the conclusion of the readout cycle, the last output data buffer again applies an impulse to lead 419 setting ECC flip-flop 420 and changing the condition of ST flip-flop 421. Accordingly, the next framing bit is examined in the same manner as previously described.

If the framing bit is incorrect, stage A is again CLEARED, and the previously described process is repeated wherein DS flip-flop 434 will be SET in the event that two successive incorrect framing bits are detected, and, as a result thereof, output common control 418 slips time slots to detect a correct framing bit.

Assuming, however, that a second consecutive correct framing bit is detected, the "not" clock impulse provides a shift pulse to shift register 430 as previously described whereby stages A and B are SET. The subsequent clock pulse then clears ECC flip-flop 420 thereby starting a new readout cycle. With DD flip-flop 439 still cleared, the data characters are still not registered by the output buffers, however.

At the conclusion of this readout cycle, the last output data buffer again sets ECC flip-flop 420, and switches the state of ST flip-flop 421. Accordingly, the next framing bit is examined. Assuming that this framing bit is correct, the "not" clock impulse sets stage A, and shifts the previous SET conditions of stages A and B to stages B and C respectively. Accordingly, all of the stages in shift register 430 are SET. This is examined by AND gate 437 whose inputs are connected to the output "1" terminals of stages A, B and C. Since all these terminals are in the high condition, gate 437 enables gate 438. The clock pulse is concurrently being applied to gate 438. Accordingly, gate 438 sets DD flip-flop 439. This restores the "1" output of DD flip-flop 439 to the high condition and with terminal DD in the high condition, the output data buffers are enabled to register the data characters. Accordingly, when the circuit falls out of synchronism, three successive correct framing bits are required to restore the circuit to the normal condition.

Output data buffer

Referring now to FIGS. 5 and 6 an output data buffer is generally indicated by block 501. All of the output data buffers are substantially identical with the exception that the first output data buffer has minor changes therein as described hereinafter.

Readout by data output buffer 501 is initiated by a pulse on terminal STP which pulse is supplied by the prior output data buffer. In the event that the output buffer is the first buffer, terminal STP extends to the corresponding terminal in the common control which, as previously described, pulses terminal STP to initiate the readout of the first output data buffer when the system is synchronized. In any event the pulse on terminal STP passes by way of lead 515 to the SET input of MS flip-flop 502 thereby setting the flip-flop. This occurs upon the initiation of the clock pulse whereby MS flip-flop 502 is SET concurrently with the reception of the initiation of the first bit of the code character to be read.

With MS flip-flop 502 SET, the "1" output terminal thereof goes high, and this high condition is applied to one input lead extending to AND gate 507. Lead 519 also extends to gate 507 and lead 519 in turn is strapped to positive battery in all output buffers with the exception of the first buffer. In the event that this is the first buffer, lead 519 is strapped to terminal DIS. As previously described, a high condition is applied to terminal DIS by the output common control when the system is synchronized, and the operation of the first output data buffer is enabled. In any event, assuming a normal operation, a high condition is applied to lead 519 whereby gate 507 is enabled. The third input to gate 507 extends to the "not" clock terminal. Accordingly, the "not" clock pulses are applied through gate 507 to AND gate 508 which pulses occur at the theoretical midpoints of the bits of the data character.

Returning now to the setting of MS flip-flop 502, the high condition transition at output terminal "1" is also applied through lead 503 to monopulser 570 which in turn applies a pulse to one input of gate 504. As described hereinafter, CM flip-flop 512 is in the CLEARED condition so long as output data buffer 501 is prepared to register a received character. With CM flip-flop 512 in the CLEARED condition, the "0" output thereof applies a high condition to gate 504. Accordingly, upon the setting of MS flip-flop 502, monopulser 570 passes a pulse through gate 504 to clear SD flip-flop 505. SD flip-flop 505 in turn applies a high condition to lead 506 which lead extends to one input AND gate 508.

Lead 518 also extends to gate 508, and lead 518 in turn is connected to terminal DD. As previously described the output common control applies a high condition to terminal DD when the system is synchronized and the output data buffers are permitted to register characters. Accordingly, assuming the system is synchronized and a high condition is applied by way of lead 518 to gate 508, the clearing of SD flip-flop 505 enables gate 508 to pass the "not" clock impulses provided by gate 507 to the shift pulse input of the bus shift register generally indicated by a block 511. Accordingly, with output data buffer 501 prepared to read in a data character, the "not" clock pulses are passed through gate 508 to provide shift pulses for bus register 511.

It is noted that the "not" clock pulses passed through gate 507 are also applied to the count input of counter 509, counter 509 normally providing a low condition at its output to gate 510. When counter 509, however, counts up to a number corresponding to intelligence elements of the code character plus 1, the output thereof goes to the high condition. Accordingly, counter 509 provides a count corresponding to the number of intelligence elements plus the flag bit of the code character.

Returning now to shift register 511, it is noted that the shift register includes a plurality of stages designated 1 through N which stages correspond to the N intelligence elements of the code character and stage F which corresponds to the flag bit accompanying the code character. The incoming code character is applied to terminal B0 of output data buffer 501 from the system bus. Terminal B0 in turn is connected through lead 517 to stage F of shift register 511. Accordingly, at the theoretical midpoint of the first data bit applied to stage F by the common bus, the "not" clock impulse applied through gate 508 drives stage F to the condition corresponding to this first bit. At approximately the theoretical midpoint of the second bit, the "not" clock impulse applied through gate 508 shifts the first bit to stage N and drives stage F to the condition corresponding to the second bit. In a similar manner each subsequent bit of the code character is inserted in shift register 511, and the prior bits are shifted down through the stages until the first bit is stored in stage 1, the last bit is stored in stage N, and the flag bit is stored in stage F.

The "not" clock pulse which applies the flag bit to stage F also advances counter 509 to its final count. Accordingly, counter 509 applies a high condition to gate 510 enabling the gate. With gate 510 enabled, the next clock pulse is passed therethrough to clear MS flip-flop 502. This removes the high condition from gate 507 and the gate is diabled. Accordingly, the "not" clock pulses are now blocked, the advancing of the counter 509 is stopped, and the registration of subsequent code elements from the common bus is terminated.

The clearing of MS flip-flop 502 also drives the "0" output thereof to the high condition. This transition to the high condition is passed by way of lead 516 to terminal STS. As previously described, terminal STS is connected to the terminal STP of the subsequent output data buffer whereby the reading of the subsequent data buffer is initiated. Of course, in the event that output data buffer 501 is the last buffer, then the high condition transition on lead 516 is passed by way of terminal STS to the output common control to enable it to scan the framing bit as previously described.

With the high condition provided at the "0" output terminal of MS flip-flop 502, a reset pulse is passed to counter 509 and counter 509 is reset to its initial count. In addition, the high condition at the "0" output of MS flip-flop 502 is passed through lead 513. This high condition transition is thus applied to the SET input of SD flip-flop 505, and the setting of SD flip-flop 505 removes the previously described application of the enabling potential to gate 508.

The high condition on lead 513 is also applied to one input of AND gate 520. The other input to AND gate 520 extends to lead 523. As described hereinafter, lead 523 is normally in the high condition with the exception of the situation wherein "idle" characters are being registered by shift register 55. Accordingly, assuming that shift register 511 is not registering an "idle" character, with lead 523 in the high condition and lead 513 going to the high condition, gate 520 is enabled to set CM flip-flop 512. Accordingly, upon the registration of the character in shift register 511, CM flip-flop 512 is set, its "0" output terminal goes low and gate 504 is disabled.

When CM flip-flop 512 is SET, the "1" output terminal of CM flip-flop 512 goes high enabling gate 521. The other input to gate 521 extends to lead 524. As described hereinafter, lead 524 is in the high condition when the output buffer is not outpulsing a data character which condition permits the readout of the character in bus shift register 511. Accordingly, assuming that the readout of shift register 511 is permissible and a high condition is applied to lead 524, AND gate 521 pulses monopulser 522. Monopulser 522 in response provides a gate pulse at the output thereof.

The gate pulse at the output of monopulser 522 is passed to lead 525, and then to an input of gate 526. The other input to gate 526 is connected to lead 527. Lead 527 is normally in the high condition with the exception of the situation wherein shift register 511 is storing a character representing the "break" or prolonged space condition. Assuming a "break" character is not stored in shift register 511, the high condition on lead 527 enables gate 526 to pass the gate pulse therethrough. The output of gate 526 is connected to the CLEAR inputs of stages 1 through N and to the SET input of stage F in shift register 511.

Accordingly, the pulse passed through gate 526 clears stages 1 through N and sets stage F. The insertion of marking bits in stages 1 through N and a spacing bit in stage F corresponds to the "idle" character. Accordingly, upon the readout of shift registetr 511, as described hereinafter, the "idle" character is inserted therein.

The gate pulse provided by monopulser 522 is also applied by way of lead 525 to a readout gate generally indicated by block 601, FIG. 6. Gate 601 functions to read out the character stored in bus shift register 511 into the channel shift register generally indicated by block 602. In addition, the gate pulse on lead 525 passes to lead 604 which is conected to the SET input of stage STP in channel shift register 602. Accordingly, the gate pulse inserts a spacing bit in stage STP corresponding to the spacing start element of the code character. In addition, the gate pulse at the output of monopulser 522 is passed to the CLEAR input of flip-flop 512. The consequent clearing of CM flip-flop 512 reenables gate 504 as previously described, thus indicating that the character in bus shift register 511 has been read out.

Returning now to gate 601, it is noted that the gate includes AND gates 605 through 609, and AND gates 611 through 615. Gates 605 through 607 have one input thereof connected by way of leads 530 through 532 to the "0" output terminals of stages 1 through N of shift register 511. The other input to gates 605 through 607 extends to lead 525. Since the outputs of gates 605 through 607 are connected to the CLEAR inputs of stages 1 through N of channel register 602, upon the application of the gate pulse to lead 525, gate 601 reads out the marking elements in bus shift register 511 and inserts them into channel shift register 602.

Similarly, one input of gates 611 through 613 in gate 601 is conected to the "1" outputs of stages 1 through N in bus register 511 by way of leads 535 through 537. With the other input to gates 611 through 613 connected to lead 525 and the output of gates 611 through 613 connected to the SET inputs of stages 1 through N of channel register 602, these gates, in response to the gate pulse, read out the spacing elements in bus register 511 and insert them in channel register 602. The gate pulse on lead 525 also functions with gates 608, 609, 614 and 615 to insert the parity bit of the code character in stage P and the final or stop bit of the code character in stage SP of channel shift register 602 as described hereinafter.

The insertion of data bits in channel shift register 602 initiates the operation of the outpulser circuit to transmit the data to output lead 628. The sensing of the character in shift register 602 is performed by OR gate 620. The input leads to OR gate 620 are connected to the "0" output terminals of stages 1 through N, P and SP of shift register 602.

Assuming now that gate 601 reads out a character from bus shift register 511 into channel shift register 602 as previously described, a marking bit will be applied to one of the stages 1 through N, P or SP of shift register 602. Accordingly, a "0" output terminal of one or more of the stages will apply a high condition to OR gate 620 which high condition is applied therethrough to oscillator control 621. Oscillator control 621 operates in response to the application of the high condition thereto to enable oscillator 622. Oscillator 622 in response thereto provides at the output thereof a train of pulses at a bit rate corresponding to the signal rate on data output lead 628.

The first output pulse of oscillator 622 is concurrently applied to the SET lead of CG flip-flop 623 and to an input lead of OR gate 624. At this moment CG flip-flop 623 is normally CLEAR whereby the "0" output thereof applies a high condition to the other input of OR gate 624. Accordingly, OR gate 624 normally applies a high condition to the input of monopulser 629. The "0" output terminal of CG flip-flop 623 is also connected by way of delay network 627 to lead 524. With CG flip-flop 623 normally in the CLEARED condition, the high condition at the "0" output terminal thereof is passed through delay network 627 to lead 524 whereby, as previously described, gate 521 is enabled to operate monopulser 522 to provide the gate pulse to read out bus shift register 511. When oscillator 622 sets CG flip-flop 623, however, the high condition at the "0" output terminal thereof is removed, removing the high condition applied to lead 524. Accordingly, during the outpulsing of the code character, gate 521 is disabled.

The first output pulse of oscillator 622 sets CG flip-flop 623 thereby removing the high condition at the "0" output thereof. Thus, gate 521 is disabled and the high condition applied through gate 624 to monopulser 629 is removed. At this time, however, oscillator 622 is applying the first output pulse to OR gate 624. Thus, the output of OR gate 624 remains high and the first output pulse of oscillator 622 does not provide a positive transition to monopulser 629 whereby monopulser 629 is not operated. It is noted that at this time that data output lead 628 which is connected to the "0" output terminal of stage STP is in the low condition, simulating a spacing start signal, since the prior gate pulse applied by way of lead 604 has set stage STP.

At the conclusion of an element duration, oscillator 622 provides the second output pulse. This second pulse is passed through OR gate 624, and monopulser 629, in response thereto, provides a pulse to lead 625. Lead 625 is connected to the shift pulse input of channel shift register 602 and to the SET input of stage SP by way of OR gate 626. Accordingly, at the termination of the start bit interval, monopulser 629 applies a shift pulse to shift register 602 and concurrently inserts a spacing bit in stage SP. The application of the shift pulse functions to advance all the code elements one stage, thereby shifting the code element stored in the first stage of shift register 602 to stage STP. Accordingly, the first intelligence element of the data character is applied to data output lead 628.

In a similar manner, each subsequent pulse from oscillator 622 operates monopulser 629, and monopulser 629 in turn advances the data bits through the stages in shift register 602 whereby successive data bits are shifted to stage STP and thus provided to data output lead 628. Concurrently therewith, each shift pulse on lead 625 is applied through OR gate 626 to insert spacing bits in stage STP. Thus, shift register 602 fills up with spacing bits which follow the data character down the shift register.

The application of shift pulses to shift register 602 continues until the stop bit previously stored in stage SP is shifted to stage STP. At this moment all the other stages are filled with the spacing bits. Accordingly, all of the "0" output terminals thereof are in the low condition and OR gate 620 provides a low condition at the output thereof. This low condition removes the enabling potential from oscillator control 621, and oscillator 622 is thereby disabled. The low condition at the output of OR gate 620 is also applied to inverter 630 which in turn passes a high condition to the CLEAR input of CG flip-flop 623. Accordingly, CG flip-flop 623 goes to the CLEAR condition, reapplying a high potential to OR gate 624. In addition, the high condition at the "0" output terminal of flip-flop 623 is applied to delay network 627. Delay network 627 delays the passage of the high condition therethrough for an interval corresponding to the duration of the stop element. At the termination of this interval, the high condition is passed through to lead 524 whereby AND gate 521 is again enabled. This indicates that the outpulsing of the data character has been completed arranging the circuit to permit the generation of another gate pulse by monopulser 522.

Summarizing the outpulsing operation, when a gate pulse generated by monopulser 522 reads a character into channel shift register 602, characters are detected by OR gate 620 to start the outpulser circuit which circuit includes oscillator control 621, oscillator 622 and CG flip-flop 623. In response to the detection of the character, the outpulser circuit provides shift pulses to channel shift register 602 whereby each of the code character bits is presented to data output lead 628. In addition, the shift pulses function to insert spacing bits in shift register 602 thereby filling up the shift register as the data character is shifted out. Concurrently with the outpulsing of the data character, AND gate 521 is disabled thereby precluding the operation of monopulser 522 to generate another gating pulse. Accordingly, during the outpulsing operation, a subsequent character cannot be read from bus shift register 511 into channel register 602. When the code character is fully read out of channel shift register 602, the outpulser circuit is restored to the idle condition, the shift pulses are terminated, and AND gate 521 is reenabled to permit the subsequent generation of another gate pulse.

Assuming now that a character is read into bus register 511 and at the conclusion thereof CM flip-flop 512 is SET, as previously described, CM flip-flop 512 in response thereto provides a positive transition to one input of gate 521. If, at this time, a code character is being outpulsed, gate 521 is disabled, as previously described, and monopulser 522 is therefore not enabled to generate the gate pulse. CM flip-flop 512, however, remains SET maintaining the high condition on gate 521. Accordingly, at the termination of the outpulsing, a high condition is applied to lead 524, as previously described, whereby monopulser 522 is operated and the gate pulse is generated to transfer the new character from bus register 511 to channel register 602 in the same manner as previously described.

Assuming now that a code character is being outpulsed out of channel register 602 and another code character is stored in bus register 511 awaiting transfer to channel register 602, the registration of a new character in bus register 511 is precluded even though a new start-to-scan cycle is initiated by the application of a pulse to terminal STP by the prior output data buffer. With the character stored in bus register 511, SD flip-flop 505 is SET, as previously described. Accordingly, a low condition is applied from the "0" terminal of SD flip-flop 505 to lead 506 to one input of gate 508 thereby disabling the gate. In addition, CM flip-flop 512 is SET as previously described, and since the generation of a gate pulse is precluded, the flip-flop remains SET so long as the character in channel register 602 is being outpulsed. Accordingly, the "0" output terminal of CM flip-flop 512 applies a low condition to gate 504 disabling the gate.

Upon the application of the new start-to-scan signal to terminal STP, MS flip-flop 502 is set, as previously described. This enables gate 507 and applies a high condition to gate 504. Since CM flip-flop 512 remains SET, however, gate 504 is disabled, precluding the clearing of SD flip-flop 505. Accordingly, gate 508 remains disabled. Thus, the "not" clock impulses are passed through gate 507 but blocked by gate 508. This precludes the entering of the character in bus register 511 but permits the counting of the bits by counter 509. Accordingly, although the registration of the character is precluded, the counter counts the data bits and at the conclusion thereof, MS flip-flop 502 is CLEARED as previously described thereby sending the start-to-scan signal to the next output data buffer. Accordingly, the sequential read-in of the characters by the output data buffers is continued although, with a character stored in bus register 511, one of the data characters which is presumably an "idle" character is discarded.

Detection of code and flag bits

Gate 601 in addition to inserting the data character in channel register 602 also gates the parity bit and the stop bit into stages P and SP of the channel register. The bit gated into stage P corresponds to the parity bit of the code character provided to the input data buffer. Similarly, the bit inserted in stage SP comprises the stop bit and corresponds to the stop bit of the code character applied to the corresponding input data buffer.

Assuming now that the code character applied by way of the bus to bus register 511 corresponds to an idle condition, this "idle" character, as previously described, supplies marking bits to stages 1 through N and a spacing bit to stage F in bus register 511. AND gate 540 has a plurality of inputs connected to the "0" output terminals of stages 1 through N, which terminals go to the high condition when the corresponding stage stores a marking bit. Accordingly, the insertion of the "idle" character in bus register 511 enables AND gate 540 to produce a high condition at the output thereof. This high condition is provided to AND gate 541. The other input to AND gate 541 extends through lead 538 to the "1" output terminal of stage F of bus register 511. Since the "1" output terminal is also in the high condition, gate 541 passes a high condition to inverter 542. Inverter 542 in turn applied a low condition to lead 523. With a low condition on lead 523, gate 520 is disabled, precluding the SETTING of CM flip-flop 512. Accordingly, the generation of a gate pulse is precluded, the insertion of a new character in channel register 602 is blocked, the operation of the outpulser circuit is thus not initiated, and the marking stop bit in stage STP is retained, thereby maintaining data output lead 628 in the idle marking condition.

When a "letters" character is received from the bus, marking bits are inserted in stages 1 through N and a marking flag bit is inserted in stage F of bus register 511. With marking bits in stages 1 through N, a high condition is produced at the output of gate 540 in the same manner as previously disclosed for the situation when an "idle" character is received. Since a marking flag bit is received for the "letters" character, however, a low condition is provided by way of lead 538 to gate 541. Accordingly, inverter 542 provides a high condition to lead 523. This enables gate 520, permitting the setting of CM flip-flop 512 whereby monopulser 522 can provide a gate pulse. Accordingly, the registration of the "letters" character permits the generation of a gate pulse and the readout of bus register 511 into channel register 602.

As previously disclosed, the code characters include parity bits. Assuming even parity and an odd number of information bits or odd parity and an even number of information bits, the "letters" character requires a marking parity bit. In this event, the output of gate 540 is strapped to one input of AND gate 545. Thus, the high condition at the output of gate 540 is passed through OR gate 545 and then by way of lead 546 to AND gate 608. Since the other input to AND gate 608 extends to lead 525, the gate pulse is thus passed through gate 608 to the CLEAR input of stage P of channel register 602. Accordingly, a marking parity bit is inserted in stage P. Conversely, if the parity bit for the "letters" character of the code dedicated to output data buffer 501 is spacing, the connection of gate 540 to gate 545 is open. Accordingly, OR gate 545 applies a low condition to inverter 549 and inverter 549 in turn applies a high condition by way of lead 550 to gate 614. The gate pulse is therefore passed by gate 614 to the SET input of stage P whereby a spacing parity bit is inserted in channel register 602.

With the "letters" character stored in bus register 511, the output of AND gate 552 is in the low condition, as described hereinafter, whereby the output of gate 553 is similarly in a low condition. This low condition is provided to inverter 554 and inverter 554 in turn applies a high condition to lead 566. Lead 566 extends to an input of gate 609 enabling gate 609 to pass the gate pulse therethrough to the CLEAR input of stage SP of channel register 602. Accordingly, a marking stop pulse is inserted in stage SP.

The high output of inverter 554 is also passed to lead 527 enabling gate 526 whereby upon the readout of bus register 511 the "idle" character is reinserted therein, as previously described. Accordingly, the "letters" character is read out of bus register 511 into channel register 602, the appropriate parity bit is inserted in stage P and a marking stop bit is inserted in stage SP. Since the gate pulse inserts a spacing start bit in stage STP and marking bits are inserted in channel register 602, the operation of the outpulsing circuit is initiated and a start-stop "letters" character is applied to data output lead 628.

When a "break" character is received by bus register 511 data output lead 628 is placed in the spacing condition. This condition is maintained until a character other than the "break" character is applied to bus register 511.

It is recalled that a "break" character comprises all spacing information bits and a marking flag bit. Accordingly, when a "break" character is received, stages 1 through N of bus register 511 are SET and stage F is CLEARED. The "1" output terminals of stages 1 through N of bus register 511 are connected to the inputs of AND gate 552. Since all the "1" output terminals are in the high condition when a "break" character is received, the output of AND gate 552 goes high. This high condition is applied to inverter 562 which in turn applies a low condition to gate 548 thereby disabling the gate. With a low condition provided to the output of gate 548, the output of OR gate 545 is low, and inverter 549 provides a high condition to lead 550. Since lead 550 extends to one input of gate 614, gate 614 is enabled to pass a gate pulse therethrough to SET stage P of channel register 602. Thus, the storage of a "break" signal in bus register 511 results in the insertion of a spacing bit in stage P. In addition, the output of gate 552 is connected to one input of gate 553. The other input to gate 553 is connected by way of lead 533 to the "0" output terminal of stage F in bus register 511. Accordingly, both inputs to gate 553 are high, and gate 553 in turn applies a high condition to the output thereof.

The high condition at the output of gate 553 is passed by way of lead 560 to AND gate 615 in gate 601. Accordingly, when a gate pulse is subsequently produced, this gate pulse passes through gate 615 and OR gate 626 to the SET input of stage SP in channel register 602. Thus, the storage of the "break" signal in bus register 511 results in the insertion of a spacing bit in stage SP of channel register 602.

The high condition at the output of gate 553 is also applied to inverter 554 which in turn passes a low condition to lead 527. This low condition on lead 527 disables gate 526. With gate 526 disabled, the gate pulse cannot insert the "idle" character in pulse register 511. This maintains the "break" condition if synchronism is lost, as described hereinafter.

The high condition at the output of gate 553 is also applied by way of lead 556 to one input of gate 557. With the other input of gate 557 connected to lead 525, the gate pulse is enabled to pass through gate 557 to clear SS flip-flop 558. As described hereinafter, SS flip-flop 558 remains in the CLEARED condition so long as the "break" characters are being received.

Assuming now that the outpulser circuit is prepared to accept the "break" character, gate 521 is enabled. After the "break" character is received, CM flip-flop 512 is SET in the same manner as previously described whereby AND gate 521 applies a high condition to monopulser 522. Accordingly, monopulser 522 produces the gate pulse and the "break" character is read from bus register 511 into channel register 602. Since, as previously described, all the intelligence bits are spacing, and spacing bits are inserted in stages P and SP of channel register 602, OR gate 620 does not read any marking bits, and the operation of the outpulser circuit is not initiated. The gate pulse, however, has SET stage STP in channel register 602. Accordingly, data output lead 628 is placed in the spacing condition, which condition is maintained to simulate a "break" condition. This operation is repeated for each successve reception of the "break" signals whereby the spacing condition of data output lead 628 remains undisturbed.

At the termination of the "break" condition, a character other than the "break" character is received by bus register 511. Accordingly, the output of gate 552 goes down and the output of gate 553 correspondingly goes down. This restores the low condition to leads 556 and 560. In addition, inverter 554 restores the high condition to lead 527 and with MS flip-flop 502 being CLEARED at the termination of the new character, lead 513 goes high whereby a high condition is passed by gate 564 to the SET input of SS flip-flop 558. This restores SS flip-flop 558 to the SET condition, providing a positive transition at its "1" output terminal. This positive transition is passed by way of lead 559 to the CLEAR input of stage STP in channel register 602. Accordingly, upon the reception of a character other than the "break" signal, stage STP is CLEARED and data output lead 628 is restored to the marking condition, thus terminating the "break" signal.

The "blank" character, when received by the output data buffer, comprises all spacing information bits and a spacing flag bit. Accordingly, when a "blank" character is received, stages 1 through N of bus register 511 are SET, and stage F is SET. Since all the "1" output terminals of stages 1 through N are in the high condition, the output of AND gates 552 goes high. With stage F set, however, the "0" output terminal thereof applies a low condition to gate 553 by way of lead 533. The output of gate 533 therefore goes low. In addition, the low condition on the "0" output terminals of stages 1 through N in bus register 511 drives the output of gate 540 to the low condition, disabling gates 541 and 544. Inverter 542 thus applies a high condition to lead 523. This permits the generation of the gate pulse to transfer the "blank" character to channel register 602. Finally, the low condition at the output of gate 553 is passed to inverter 554 which in turn provides high conditions to leads 527 and 566. With a high condition on lead 566, the gate pulse inserts a marking stop bit in stage SP of channel register 602. Accordingly, the "blank" character is read out of bus register 511 and inserted in channel register 602 in the conventional manner, the gate pulse inserting the appropriate start and stop bits.

We have previously assumed that the code character includes a parity bit which provides even parity. With this arrangement inverter 562 is connected to gate 548 whereby gate 548 is disabled upon the reception of the "blank" character. With both gates 544 and 548 disabled, OR gate 545 applies a low condition to inverter 549. Inverter 549 in turn applies a high condition to lead 550 enabling gate 614 whereby a spacing bit is inserted in stage P of channel register 602. Accordingly, with the even parity code, a spacing parity bit is inserted upon the reception of the "blank" character.

As previously described, the input data buffer during the transmission of normal data characters provides a spacing flag when a marking parity bit is received and a marking flag when a spacing parity bit is received. The output data buffer then examines the flag bit and inserts the appropriate parity bit in stage P of channel register 602. During the reception of normal characters, the output of gates 540 and 552 are low, and the normal transfer of characters from bus register 511 to channel register 602 is provided as previously described. With gate 552 low, inverter 562 provides enabling potential to gate 548. Concurrently, with the output of gate 540 low, gate 544 is disabled. Accordingly, only gate 548 can apply a high condition to OR gate 545.

Assuming now that the received code character includes a marking flag, the "1" output terminal of stage F in bus register 511 goes low, and gate 548 is disabled. The resultant low condition at the output thereof is applied to inverter 549 and inverter 549 in turn applies a high condition to lead 550. Accordingly, gate 614 is enabled and a spacing bit is inserted in stage P of channel register 602. Conversely, if a spacing flag is received, the "1" output of stage F of bus register 511 goes high, and gate 548 applies a high condition through OR gate 545 to lead 546. This enables gate 608 to insert a marking bit in stage P of channel register 602. Accordingly, upon the reception of a marking flag, a spacing parity bit is inserted and upon reception of a spacing flag, a marking parity bit is inserted in channel register 602.

During the reception of normal characters, the circuit also inserts a stop bit into channel register 602. When a conventional character is received, the output of gate 552 goes low as previously described. The output of gate 553 consequently also goes low and inverter 554 applies a high condition to lead 566. Gate 609 is thus enabled to pass the gate pulse therethrough. Accordingly, a marking bit is inserted in stage SP which bit constitutes the marking stop element of the code character.

Bit distribution during synchronization recovery

When synchronization is lost, the output common control precludes the registration of characters and the counting of character bits by the output data buffers as previously described. When a proper framing bit is detected, however, the output data buffers are permitted to count the data bits but the registration of the characters is precluded until three successive proper framing bits are detected.

Assuming now that the system loses synchronization, the normal high conditions on terminal DD is removed. In addition, the high condition applied to terminal DIS in the first output data buffer is also removed. Accordingly, gate 508 in each of the data buffers is disabled, and gate 507 in the first output data buffer is similarly disabled. With gate 507 disabled in the first output data buffer, the "not" clock pulses applied therethrough to counter 509 are blocked. When a scan cycle is started by the output common control, the first output buffer MS flip-flop 502 is SET, as previously described. During loss of synchronization, however, gate 507 is disabled blocking the application of the "not" clock pulses to counter 509. Thus MS flip-flop 502 remains SET while the low condition is maintained on terminal DIS.

When, after losing synchronization, an appropriate framing bit is detected, the condition on terminal DIS goes high, and gate 507 in the first output data buffer is enabled. Thereafter the "not" clock pulses are permitted to pass through gate 507 to counter 509. Gate 508 remains blocked, however, because of the low conditions on terminal DD, precluding the registration of the character received from the bus on lead 517. Accordingly, although the character is not registered, at the termination of the appropriate count MS flip-flop 502 is CLEARED, as previously described, and the start-to-scan signal is sent to the second output data buffer.

When the second output data buffer receives the start-to-scan signal on its terminal STP, the MS flip-flop 502 therein is set, enabling gate 507. The DD terminal, however, is still in the low condition, and gate 508 is disabled. Accordingly, the second output data buffer counts the data bits, but does not register the data character. Thus, each output data buffer counts the bits and starts the next data buffer but does not register the character. The process is repeated until the last buffer counts the bits and, at the termination of the count, the last data buffer signals the output common control over its terminal STS–N and the output common control scans the next bit to determine if it is the proper framing bit as previously described. These cycles are repeated until the output common control regains synchronization, as previously described, restoring the high conditions on terminals DIS and DD on the output data buffers.

It is noted that during loss of synchronization, when the output data buffers are counting but not registering the characters, MS flip-flop 502 therein cycles by being successively SET and CLEARED. This, in turn, successively CLEARS and SETS SD flip-flop 505. CM flip-flop 512, however, remains in the CLEAR condition, since, as previously described, the circuit inserts the "idle" character in bus register 511 whereby a low condition is provided to lead 523. This low condition on lead 523 disables gate 520, precluding the setting of CM flip-flop 512. Accordingly, upon loss of synchronization, each output buffer inserts the "idle" character in bus register 511, precluding the outpulsing of channel register 602 whereby data output lead 628 is maintained in the idle marking condition. In the event, however, that a "break" character is in bus register 511, CM flip-flop 512 cycles since lead 527 is maintained in a low condition, as previously described. This low condition disables gate 526 whereby the "idle" character is not inserted in bus register 511. Accordingly, the "break" character is retained in bus register 511 as previously described. With the "break" character retained in bus register 511, outpulsing of channel register 602 is precluded, as previously described. A spacing "break" condition is maintained on output lead 628, however, since stage STP of channel register 602 has been SET, as previously described. Thus, if the output data buffer received a "break" signal just prior to loss of synchronization, the "break" condition on data output lead 628 is maintained until synchronization is restored and a new character is received.

Although a specific embodiment of the invention has been shown and described, it will be understood that various modifications may be made without departing from the spirit of the invention and within the scope of the appended claims.

What is claimed is:

1. In a time division system for transmitting data codes which include permutation code element characters, a common transmission path, a plurality of sequential input ports, each of said input ports being dedicated to a predetermined one of said codes, a plurality of output ports, each of said output ports associated with an input port and dedicated to the corresponding code, signaling means individual to each of said input ports for sending a code character to said common path, said signaling means including means for serially applying a plurality of said code elements to said common path corresponding to the number of elements in each of the characters of the code dedicated to said input port, means responsive to each of said signaling means applying the last element of said plurality of elements to said path for initiating the operation of the signaling means individual to the next subsequent one of said input ports, receiving means individual to each output port for receiving a code character from said path, said receiving means including means for reading a plurality of serial elements applied to said path corresponding to the number of elements in each of the characters of the code dedicated to said output port, and means responsive to each of said receiving means reading the last element of said plurality of elements for initiating the operation of the receiving means individual to the next subsequent one of said output ports.

2. In a time division transmission system, a plurality of sequential input ports for receiving code character bits, an output port corresponding to each input port, a common transmission path interconnecting said input ports and said output ports, means individual to each of said input ports for serially applying all of the bits of said received code character to said path, input port enabling means responsive to the application of all of the bits of the character to said path by each of said applying means for enabling said applying means individual to the next subsequent one of said input ports, means included in each of said output ports for registering all of the bits of a code character applied thereto by said path, and output port enabling means individual to each of said registering means and responsive to the application of all of the bits of the character thereto for enabling the application of bits from said path to said registering means individual to the next subsequent one of said output ports.

3. In a time division transmission system in accordance with claim 2 further including a source of pulses having a repetition rate corresponding to the signaling rate of said path, said applying means including means enabled by each pulse from said source for applying a bit to said path, said input port enabling means including a pulse steering circuit for steering circuit for steering said pulses from said source to the next subsequent one of said input ports.

4. In a time division transmission system in accordance with claim 3 wherein said registering means includes means enabled by each pulse from said source for registering a bit applied by said path, and said output port enabling means includes a pulse steering circuit for steering said pulses from said source to the next subsequent one of said output ports.

5. In a time division transmission system in accordance with claim 2 wherein said applying means includes a storage circuit for storing said bits of said received character prior to said application to said path, and said input port enabling means includes means for detecting the presence of said bits in said storage circuit, said detecting means including means responsive to the removal of all of said bits from said storage circuit for enabling said next subsequent input port.

6. In a time division transmission system in accordance with claim 5 wherein said applying means includes means responsive to said enabling of said applying means for inserting a flag bit in said storage circuit for application to said path.

7. In a time division transmission system in accordance with claim 6 wherein said inserting means includes means operable in the absence of the reception of a code character by said input port for inverting the flag bit.

8. In a time division transmission system in accordance with claim 7 wherein said registering means includes means responsive to the registration of said inverted flag bit for applying a prolonged signal condition to said output port.

9. In a time division system in accordance with claim 2 wherein each of said output port enabling means includes means for counting the bits applied to said registering means, said counting means arranged to operate said output port enabling means upon counting a predetermined number of bits corresponding to the number of bits included in said code character.

10. In a time division system in accordance with claim 9 further including synchronizing means for concurrently enabling said applying means individual to one of said input ports and registering means individual to the corresponding one of said output ports, and means for detecting failure of said synchronizing means, said failure detecting means further including means for disabling said counting means and said registering means.

11. In a time division system in accordance with claim 10 wherein said failure detecting means includes means for recovering synchronization, said synchronization recovering means further including means for reenabling said disabled counting means whereby each of said output ports provides counting but precludes bit registration.

12. In a time division signaling system which includes a data signal repeater circuit arranged to read the signal element conditions of incoming code characters and generate and sequentially apply bits to an output path, said bits corresponding to the signal conditions of the code character elements, said repeater circuit being further arranged to generate and apply a flag bit to the output path, and means responsive to the reception of a prolonged signal condition for modifying the flag bit, whereby the sequence of bits generated for the prolonged signal condition is distinguishable from the sequence of bits-generated for the code characters having all elements corresponding to the prolonged signal condition.

13. In a time division signaling system in accordance with claim 12 wherein said signal elements of said code characters include a parity signal element, said repeater circuit being further arranged to normally generate the flag bit to correspond to the parity signal element condition and said modifying means being arranged to invert the signal condition of the flag bit.

References Cited

UNITED STATES PATENTS

| | | | |
|---|---|---|---|
| 3,197,563 | 7/1965 | Hamsher | 179—15 |
| 3,310,626 | 3/1967 | Cassidy | 179—15 |
| 3,334,181 | 8/1967 | Bartlett | 179—15 |
| 3,366,737 | 1/1968 | Brown | 179—15 XR |
| 3,377,585 | 4/1968 | Magnin | 179—15 |
| 2,840,705 | 6/1958 | Scully | 340—147 XR |
| 2,919,435 | 12/1959 | Hawley | 340—147 |
| 3,065,303 | 11/1962 | Kaneko | 179—15 |

RICHARD MURRAY, Primary Examiner

CARL R. VON HELLENS, Assistant Examiner